(12) United States Patent
Hongo et al.

(10) Patent No.: US 8,023,365 B2
(45) Date of Patent: Sep. 20, 2011

(54) OPTICAL NEAR-FIELD GENERATING DEVICE, OPTICAL NEAR-FIELD GENERATING METHOD AND INFORMATION RECORDING AND REPRODUCING APPARATUS

(75) Inventors: Kazuhiro Hongo, Kanagawa (JP); Tetsu Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 373 days.

(21) Appl. No.: 11/902,725

(22) Filed: Sep. 25, 2007

(65) Prior Publication Data

US 2008/0080039 A1 Apr. 3, 2008

(30) Foreign Application Priority Data

Oct. 2, 2006 (JP) .................................. 2006-271009

(51) Int. Cl.
*G11B 11/00* (2006.01)
(52) U.S. Cl. .................................................. 369/13.33
(58) Field of Classification Search ........................ None
See application file for complete search history.

(56) References Cited

U.S. PATENT DOCUMENTS

| 2004/0085862 A1* | 5/2004 | Matsumoto et al. | ........ 369/13.33 |
| 2005/0007654 A1* | 1/2005 | Yamada et al. | ................ 359/321 |
| 2005/0226636 A1* | 10/2005 | Hiramatsu et al. | ............ 398/182 |
| 2007/0242253 A1* | 10/2007 | Visser et al. | ..................... 355/67 |

FOREIGN PATENT DOCUMENTS

| JP | 2004-117181 | 4/2004 |
| JP | 2004-151046 | 5/2004 |
| JP | 2004-273021 | 9/2004 |
| JP | 2004-303299 | 10/2004 |

OTHER PUBLICATIONS

Japanese Office Action issued Mar. 29, 2011 for corresponding Japanese Office Action No. 2006-271009.

* cited by examiner

*Primary Examiner* — Joseph Feild
*Assistant Examiner* — Henok Heyi
(74) *Attorney, Agent, or Firm* — Rader, Fishman & Grauer PLLC

(57) ABSTRACT

An optical near-field generating device is provided. The optical near-field generating device includes: a light source; a light transmissive substrate; and a conductive scatterer irradiated with light from the light source to generate an optical near-field. The scatterer is formed across planes with different heights on the light transmissive substrate and includes a first area formed on a surface closest to an object to which the optical near-field is applied and a second area formed on a surface distant from the object as compared with the first area. The optical near-field is generated from the first area of the scatterer toward the object.

21 Claims, 35 Drawing Sheets

FIG. 18A
FIG. 18B
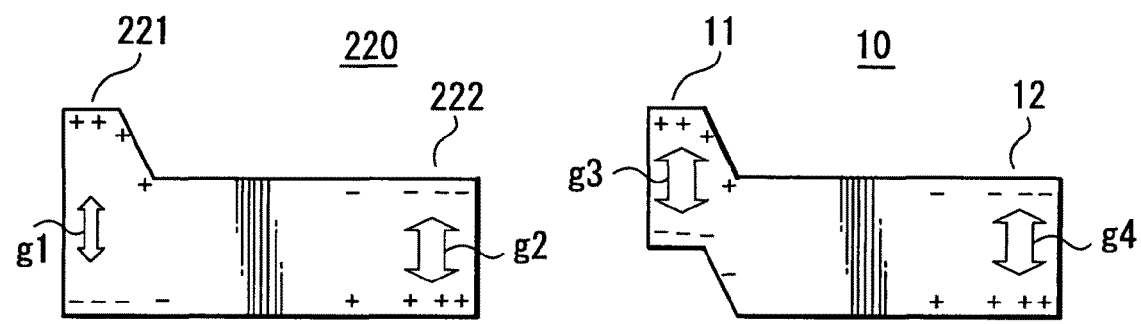
FIG. 19
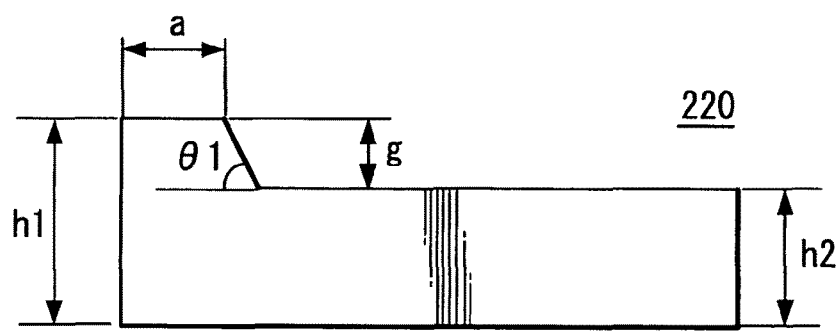

OPTICAL NEAR-FIELD GENERATING DEVICE, OPTICAL NEAR-FIELD GENERATING METHOD AND INFORMATION RECORDING AND REPRODUCING APPARATUS

CROSS REFERENCES TO RELATED APPLICATIONS

The present invention contains subject matter related to Japanese Patent Application JP 2006-271009 filed in the Japanese Patent Office on Oct. 2, 2006, the entire contents of which being incorporated herein by reference.

BACKGROUND OF THE INVENTION

1. Field of the Invention

The present invention relates to an optical near-field generating device capable of generating optical near-fields by irradiating a scatterer made of a conductive material with light, an optical near-field generating method and an information recording and reproducing apparatus.

2. Description of the Related Art

As high density recording of magnetic recording technology advances more in recent years, development of a recording system for recording a magnetic recording film with high coercive force capable of high density recording is requested. As a promising method for developing such recording system, a heat-assisted magnetic recording (or light-assisted magnetic recording) in which a recording area is locally irradiated with light to locally lower coercive force of a magnetic recording medium to enable a magnetic head to record information receives a remarkable attention. In order to obtain high density magnetic recording in the heat-assisted magnetic recording, it may be necessary to reduce a size of a beam spot of focusing light. As a method of obtaining a small focusing beam spot beyond a limit of diffraction of light, various technologies using optical near-fields have been proposed and a method using surface plasmons generated from a metal scatterer, for example, is known as one of such proposed technologies. When a metal scatterer is in use, a shape of a scatterer affects a size of a spot of an optical near-field and focusing efficiency of the optical near-field. Therefore, various studies have been made so far on the shape of practical scatterers capable of generating optical near-fields with high efficiency.

A method of obtaining a small focusing beam spot by using surface plasmon resonance phenomenon caused by a metal scatterer will be described with reference to FIG. 1. As shown in FIG. 1, a rod-like scatterer 410 made of a conductive metal is formed on the flat surface of a substrate 401 typically made of a light transmissive material. The longitudinal direction of the scatterer 410 and the polarization direction of irradiated light are aligned and the length in the longitudinal direction of the scatterer 410 is suitably selected in accordance with conditions under which surface plasmons may be excited, thereby exciting surface plasmons.

The scatterer 410 located and configured in accordance with such suitable conditions is irradiated with light Li from the side of the substrate 410, as shown in FIG. 2. As a result, charges are polarized by an electric field caused by the incident light Li on a light-receiving surface 410d serving as the surface of the scatterer 410 irradiated with the incident light L1 and a light-emitting surface 410e of the opposite surface of the light-receiving surface 410d and which is the surface facing an object 450 to optical near-fields. Oscillation generated when charges are polarized is surface plasmons. When a resonance wavelength of surface plasmons is equal to a wavelength of incident light Li, surface plasmons are in a resonance state called surface plasmon resonance and the scatterer 410 becomes an electric dipole, which is strongly polarized in the direction of polarization. When the scatterer 410 becomes the electric dipole, large electromagnetic field is generated near respective ends in the longitudinal direction of the scatterer 410 to generate an optical near-field Ln. As shown in FIG. 2, while the optical near-field Ln is generated on both the light-receiving surface 410d and the light-emitting surface 410e of the scatterer 410, their optimum resonance wavelengths may vary depending on materials and shapes of structural bodies around the scatterer 410. When applying an optical near-field to the object 450 such as an information recording medium, the shape of the scatterer 410 should be adjusted so that the optical near-field Ln on the light-emitting surface 410e may be intensified.

In the thus adjusted scatterer 410, an intensive optical near-field can be generated with a beam spot of a small diameter. Since the scatterer 410 becomes the electric dipole, an optical near-field is generated in two places and there is such a problem that optical near-fields may be applied to other portions than required. In a heat-assisted magnetic recording, when an optical near-field is applied to other portions than required, if a mark indicating that information was already magnetically recorded exists on such portions, then a recording retention life of the object such as an information recording medium is reduced by thermal demagnetization, which affects reliability of the information recording medium considerably.

Japanese Unexamined Patent Application Publication No. 2004-151046 (JP 2004-151046 A), for example, proposes a method of removing the surface of other portions than a vertex to generate an optical near-field by a treatment such as etching so that a depth between an object and the other portions is deeper than a reaching depth of the optical near field.

Also, Japanese Unexamined Patent Application Publication No. 2004-303299 (JP 2004-303299 A), for example, proposes a method of improving integration of a magnetic head and an optical head, in which an optical near-field generating portion and a magnetic field generating portion to be the same position by providing a narrowed portion in a conductor.

SUMMARY OF THE INVENTION

The technology disclosed in JP 2004-151046 A uses a method of adjusting the shape of a scatterer such as mentioned above, that is, obliquely removing other portions than the optical near-field generating area so that the depth is deeper than a reaching depth of the optical near-field by anisotropic etching such as ion milling and RIE (reactive ion etching). An optical near-field generating vertex is formed by blocking a portion with a substrate in such etching process. In this case, since the tip end of the scatterer is formed as a shape with an acute angle, if anisotropy of etching is not precise, then there is a risk that the vertex will be displaced from the height of the substrate surface. As a result, there is a possibility that a distance between the object such as a recording medium and the tip end portion of the scatterer may vary.

FIG. 3 shows a relationship between intensity of an optical near-field and a distance from a place where the optical near-field is generated. A model of a scatterer for use with analysis is shaped in such a manner that a scatterer 410 having a constant thickness is formed on a substrate 401 made of glass as shown in FIG. 4, and the relationship is obtained using an FDTD (Finite Difference Time Domain) method as an analysis method. As shown in FIG. 3, since intensity of the optical near-field is reduced exponentially relative to a distance, if a distance is changed only several nm, then intensity of the optical near-field is changed considerably. Accordingly, if the height of a portion of the scatterer from which the optical near-field is generated varies, there is then a possibility that a yield of an optical near-field generating device will be affected considerably.

Further, JP 2004-151046 A proposes a method of removing the scatterer at its surface near the optical near-field generating area in a stepwise fashion. However, an amount of the stepwise portion removed should be controlled with accuracy in the order of several nm with respect to the depth direction in order that a head for use with the above-mentioned heat-assisted magnetic recording have resolution with high accuracy. It is difficult to carry out etching in the order of nm with a high yield. JP 2004-151046 A discloses a method using selective etching as a method to enable the above-mentioned etching to be carried out. However, a scatterer should be made of materials of two kinds, which causes a cost of an optical near-field generating device to increase.

Further, in JP 2004-151046 A, portions from which an optical near-field is generated but not used are removed so that the scatterer may be away from the object with a distance longer than the reaching depth of the optical near-field, thereby reducing the influence of such optical near-field. In this case, if an optical near-field generating device has a structure in which the longitudinal direction of the scatterer is parallel to the object, then the thickness of a place from which an optical near-field is generated and used is thicker than the area from which an optical near-field is generated but not used. As described above, if the area generating an optical near-field is thicker than the other area, then it is difficult to generate the optical near-field with high efficiency and there is a problem that sufficiently high intensity of light may not be obtained.

When heat-assisted magnetic recording is carried out, it is important for an optical head to have affinity with a magnetic head. Since the magnetic head and optical head are requested to be relatively aligned with high accuracy and high-speed writing may require rapid heating and cooling, the magnetic head and optical head should be located close to each other. However, JP 2004-151046 A has not disclosed specific methods.

JP 2004-303299 A proposes a method of aligning an optical near-field generating portion and a magnetic field generating portion by providing a narrowed portion in a conductor as a method of combining a magnetic head and an optical head. However, electric resistance ratio of the narrowed portion may increase and then there is a possibility that the structure of JP 2004-303299 A may be broken by overheating or the like. Specifically, since the thickness of the conductor should be selected to be a wavelength of incident light or less in order to cause surface plasmons to be efficiently excited in the narrowed portion and the width of the narrowed portion should be selected to be 1 μm or less in order to intensify the magnetic field. Therefore, according to the structure described in JP 2004-303299 A, it is difficult to obtain both the optical near-field of high intensity and a magnetic field of a large magnitude.

It is desirable to provide an optical near-field generating device and an optical near-field generating method in which influences of an optical near-field not for use on a scatterer generating surface plasmons can be suppressed and in which the shape of an optical near-field generating area can be excellently controlled and manufactured.

Also, it is desirable to provide an information recording and reproducing apparatus using the optical near-field generating device and the optical near-field generating method in which an optical near-field can be generated efficiently and which is capable of being combined with a magnetic field generating portion with ease.

An optical near-field generating device according to an embodiment of the present invention includes: a light source, a light transmissive substrate and a conductive scatterer irradiated with light from the light source to generate an optical near-field. The scatterer is formed across planes with different heights on the light transmissive substrate and includes a first area formed on a surface closest to an object to which the optical near-field is applied and a second area formed on a plane distant from the object as compared with the first area. The optical near-field is generated from the first area of the scatterer toward the object.

An optical near-field generating method according to an embodiment of the present invention includes the steps of:

forming a scatterer having a shape deposited across planes with different heights provided on a light transmissive substrate;

arranging an area formed on the highest surface of the substrate close to a surface of an object with a distance equal to or less than a reaching length of an optical near-field; and applying the optical near-field to the surface of the object.

According to the above-mentioned optical near-field generating device and optical near-field generating method of the embodiments, a simplified method of forming level differences on the substrate, on which the scatterer having a desired pattern is formed, is used. Accordingly, the scatterer having the shape in which only the area generating an optical near-field for use is positioned close to an object and an area generating an optical near-field not for use is distant from the object can be manufactured easily with excellent controllability.

Further, in the optical near-field generating device according to an embodiment of the present invention, it is desirable that the scatterer generates an optical near-field from the first area at least a part of which is formed as a flat surface arranged substantially parallel to a surface of the object.

When the optical near-field generating device has the above-mentioned arrangement, a space between the object and the first area to generate an optical near-field can be controlled from being varied.

Further, in the optical near-field generating device according to an embodiment of the present invention, it is desirable that the scatterer is formed so as to satisfy a relationship expressed by $$h1 \leq h2 \qquad (1)$$

where $h1$ represents a thickness of the first area and $h2$ represents a thickness of the second area which is farthest from the first area.

As a result of intensive studies by the inventors of the present invention and others, it is verified that intensity of an optical near-field increases at a thin portion of a scatterer having a thickness which is not constant, because surface plasmons on the substrate side surface of the scatterer and surface plasmons on the object side surface are coupled. Therefore, it is understood that desirably the thickness of the area generating an optical near-field not for use should be made constant rather than made thin. Further, it is understood that desirably the thickness of the area generating an optical near-field for use should be made thinner than that of other areas. Accordingly, in the embodiments of the present invention, the scatterer is configured to satisfy the relationship expressed by the above-described equation (1) and hence an optical near-field can be generated reliably without lowering efficiency.

An information recording and reproducing apparatus according to an embodiment of the present invention includes a light source, a light transmissive substrate, a scatterer facing an information recording medium and an optical system having a function of introducing light emitted from the light source to the scatterer. In the information recording and reproducing apparatus, information is recorded on the information recording medium by applying an optical near-field generated from the scatterer to a predetermined position of the information recording medium. The scatterer is formed across surfaces with different heights provided on the light transmissive substrate and includes a first area formed on a surface closest to the information recording medium and a second area formed on the surface distant from the information recording medium as compared with the first area on the substrate. The optical near-field is generated from the first area of the scatterer toward a predetermined position of the information recording medium.

According to the above-mentioned information recording and reproducing apparatus of an embodiment of the present invention, the information recording and reproducing apparatus uses the optical near-field generating device having the arrangement according to an embodiment of the present invention. Accordingly, the scatterer in which only the area generating an optical near-field for use is made close to an object and the area generating an optical near-field not for use is made distant from the object can be manufactured with excellent controllability and without difficulty. As a result, an information recording and reproducing apparatus capable of efficiently generating an optical near-field and easily combining with the magnetic field generating portion can be provided.

According to an embodiment of the optical near-field generating device and the optical near-field generating method of the present invention, influences of an optical near-field not for use in the scatterer which generates surface plasmons can be suppressed and the shape of the area generating an optical near-field for use can be manufactured with excellent controllability.

According to an embodiment of the information recording and reproducing apparatus of the present invention, an optical near-field can be generated efficiently and the apparatus can be used in combination with the magnetic field generating portion without difficulty.

BRIEF DESCRIPTION OF THE DRAWINGS

FIG. 18A is a diagram showing an electric charge distribution of a scatterer according to a comparative example, FIG. 18B is a diagram showing an electric charge distribution of a scatterer according to an example.

FIG. 19 is a schematic side view showing an arrangement of a scatterer according to a comparative example.

DESCRIPTION OF THE PREFERRED EMBODIMENTS

Embodiments of the present invention will be described below and it should be appreciated that the present invention is not limited to those embodiments.

Figure 1:
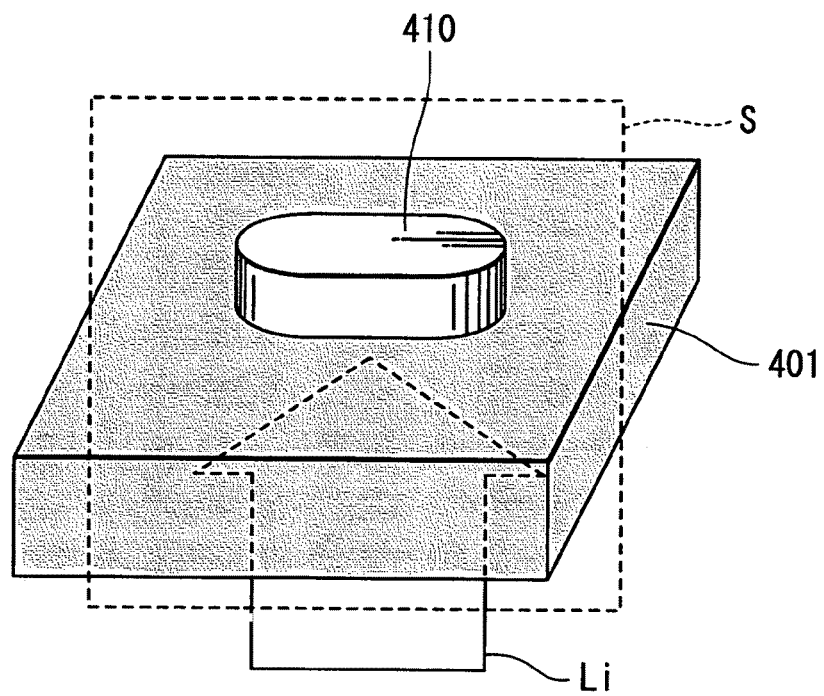
FIG. 1 is a schematic perspective view showing an arrangement of an example of a scatterer according to the related art.
Figure 2:
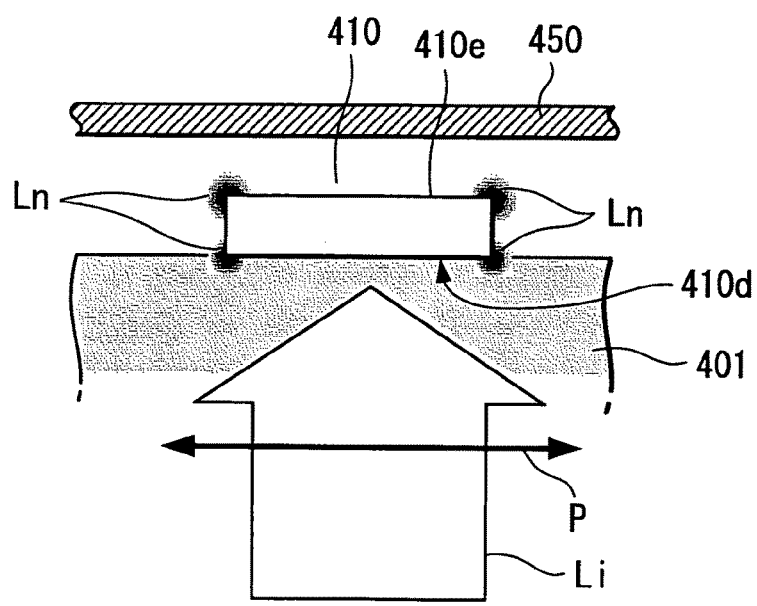
FIG. 2 is a schematic diagram to which reference will be made in explaining a principle of generating an optical near-field using a scatterer according to the related art.
Figure 3:
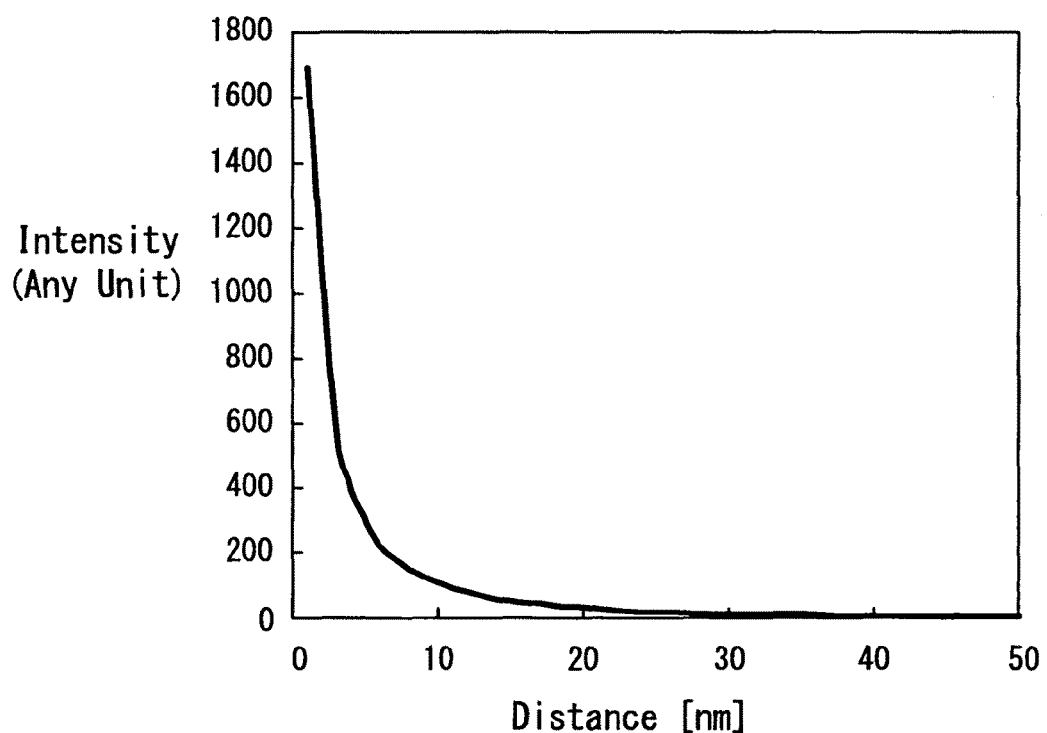
FIG. 3 is a diagram showing optical near-field intensity distribution relative to a distance between a scatterer and an object.
Figure 4:
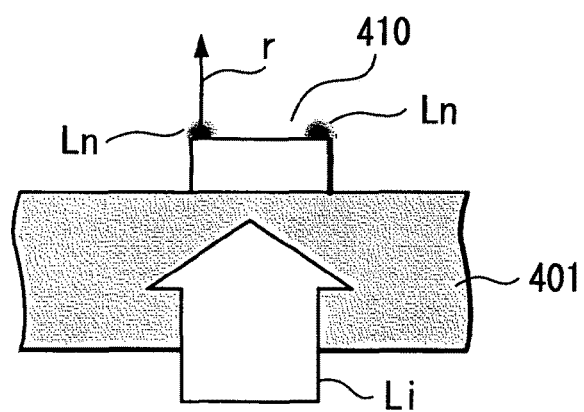
FIG. 4 is a diagram to which reference will be made in explaining an optical near-field generated on the surface of a scatterer according to the related art.
Figure 5:
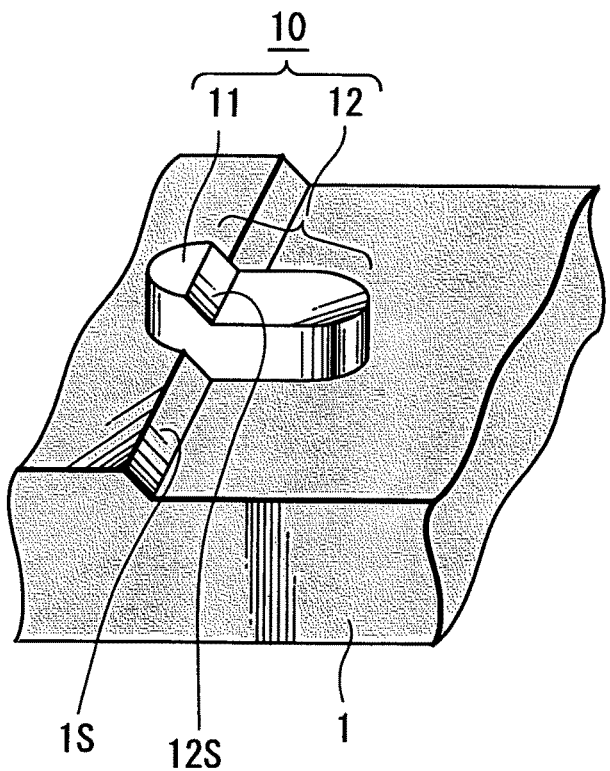
FIG. 5 is a schematic perspective view showing an arrangement of a scatterer for use with an optical near-field generating device according to an embodiment of the present invention.

FIG. 5 is a schematic perspective view showing an arrangement of a main portion of an optical near-field generating device according to an embodiment of the present invention. As shown in FIG. 5, a scatterer 10 for use with an optical near-field generating device according to an embodiment of the present invention is shaped like a rod provided across surfaces with different heights on a light transmissive substrate 1. The scatterer 10 includes a first area 11 formed on the substrate 1 at its surface closest to an object to which an optical near-field is applied and a second area 12 formed on the surface distant from the object as compared with the first area 11. The length in the longitudinal direction of the scatterer 10 according to an embodiment of the present invention is suitably selected in such a manner that surface plasmons are excited on the scatterer 10 at its surface facing the object such as an information recording medium when incident light is received by the scatterer 10. Such configuration can be made easily by forming the scatterer 10 made of metal including a predetermined pattern on suitable level differences provided previously on the substrate 1. The example shown in FIG. 1 illustrates the case in which at least part of the first area 11 may be formed as a flat surface.

Figure 6:
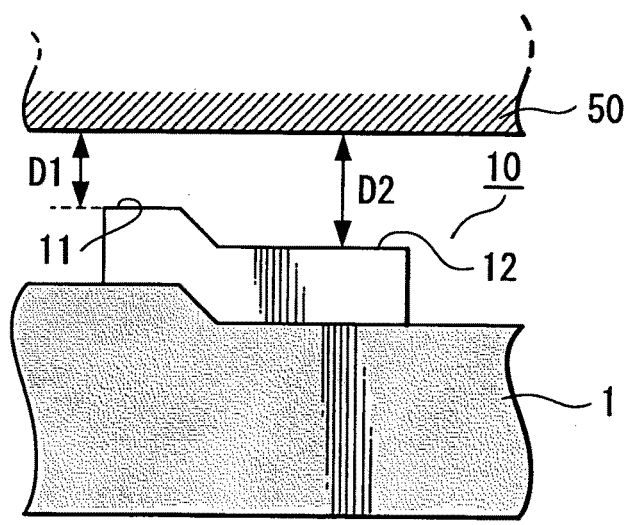
FIG. 6 is a schematic side view showing an arrangement of a scatterer for use with an optical near-field generating device according to an embodiment of the present invention.

FIG. 6 is a schematic side view showing a state in which the scatterer 10 faces an object 50 to which an optical near-field is applied. As shown in FIG. 6, an optical near-field Ln is generated in the state where the flat surface of the first area 11 of the scatterer 10 faces the surface of the object 50 substantially parallel. At that time, respective distances D1 and D2 between the first and second areas 11 and 12 and the object 50 are selected to satisfy D1<D2. Here, if the substrate 1 is provided with previously-formed level differences such that the distance D2 may become a distance equal to or deeper than the reaching length of an optical near-field, more preferably a distance beyond the reaching length of the optical near-field, the optical near-field can be prevented from reaching the object 50. Here, a reaching depth of the optical near-field is defined as a distance in which light intensity becomes ½ of that on the surface of the scatterer 10.

Figure 7:
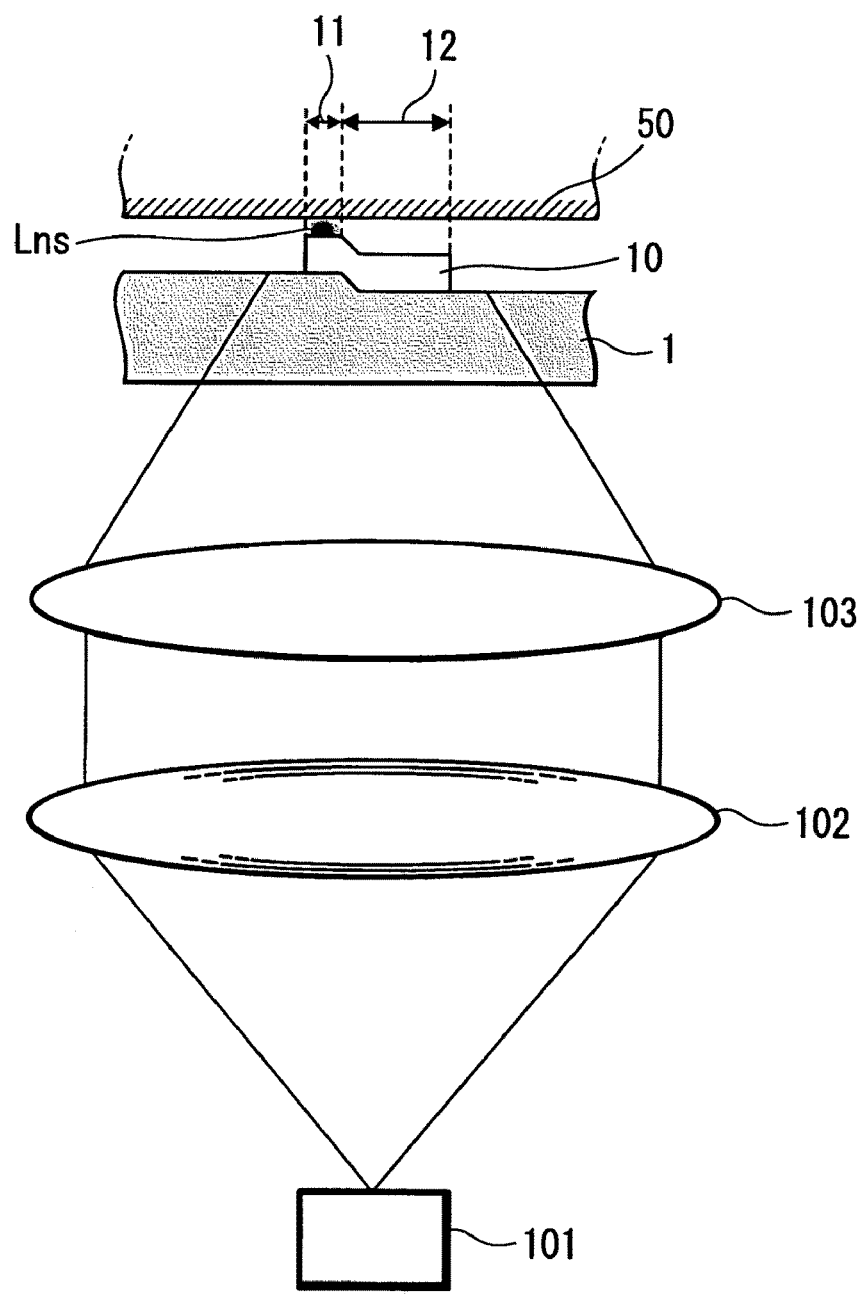
FIG. 7 is a schematic diagram showing an arrangement of an optical near-field generating device according to an embodiment of the present invention.

FIG. 7 is a schematic diagram showing an optical near-field generating device 100 including the scatterer 10 having the above-mentioned arrangement according to an embodiment of the present invention. As shown in FIG. 7, light emitted from a light source 101 is collimated by a collimator lens 102 and the collimated light is applied to the scatterer 10 from the rear of the substrate 1 by a focusing device 103 such as an optical lens. At that time, the light source 101, the collimator lens 102, the focusing device 103 and the scatterer 10 are located and configured in such a manner that the polarization direction of incident light may become substantially coincident with the longitudinal direction of the scatterer 10. With this configuration, an optical near-field Lns is generated on the first area 11 of the scatterer 10 and emitted to the object 50. Although an optical near-field is generated on the second area 12 of the scatterer 10 due to excitation of surface plasmons, the second area 12 is distant from the object 50 as compared with the first area 11 and the distance is selected to be longer than the reaching length of the optical near-field. Thus, influences of the optical near-field not for use can be suppressed or avoided so that excellent recording characteristics can be maintained.

Further, according to this embodiment of the present invention, the first area 11 has the flat surface, from which an optical near-field of the scatterer 10 is generated, is located substantially parallel to the surface of the object 50 and the optical near-field can be generated from the first area 11 in this state. The flat surface can be formed easily from a manufacturing standpoint and flatness can be held with high accuracy. In addition, in that case, since the distance between the first area 11 from which an optical near-field is generated and the object 50 is defined based on a distance between the surfaces, the space can be controlled with high accuracy and it becomes possible to retain a suitable space when an optical near-field is applied to the object 50. Specifically, both from a manufacturing standpoint and a control standpoint, the space between the first area 11 to generate an optical near-field and the object 50 can be held constant with ease. As compared with the case of using a scatterer shaped to have a vertex of an acute angle toward the object 50, the embodiment may obtain excellent features not only from manufacturing and control standpoints but also from standpoints on SNR (signal-to-noise ratio) and stability of shape of mark relative to the distance, when the embodiment is applied to an information recording and reproducing apparatus.

Smaller the area of the first area 11 of the scatterer 10 becomes, higher the intensity of an optical near-field can be generated from the first area 11. Therefore, desirably the area of the first area 11 should be equal to or less than half the whole of the surface facing the object 50.

Further, when an optical near-field is applied to the object 50, desirably the flat surface of the first area 11 and the surface of the object 50 should be held substantially parallel to each other. However, an embodiment of the present invention is not limited thereto and the flat surface of the first area 11 may be inclined at an angle of several degrees or more, for example, approximately 10 degrees. In actual practice, an allowable angle range, in which the flat surface of the first area 11 is displaced from the parallel state, changes depending on a use of the scatterer 10. When the scatterer 10 is applied to an information recording and reproducing apparatus, for example, desirably, the allowable angle range should be suitably selected depending on conditions such as a size of a recording mark, a distance between recording tracks, a space to be set between the scatterer 10 and an information recording medium.

Further, since planar shape and size of the first area 11 which generates an optical near-field are reflected on the shape of a beam spot of the optical near-field, it is desirable that the planar shape and size of the first area 11 should be selected in response to a desired shape of a beam spot of the optical near-field.

Figure 8:
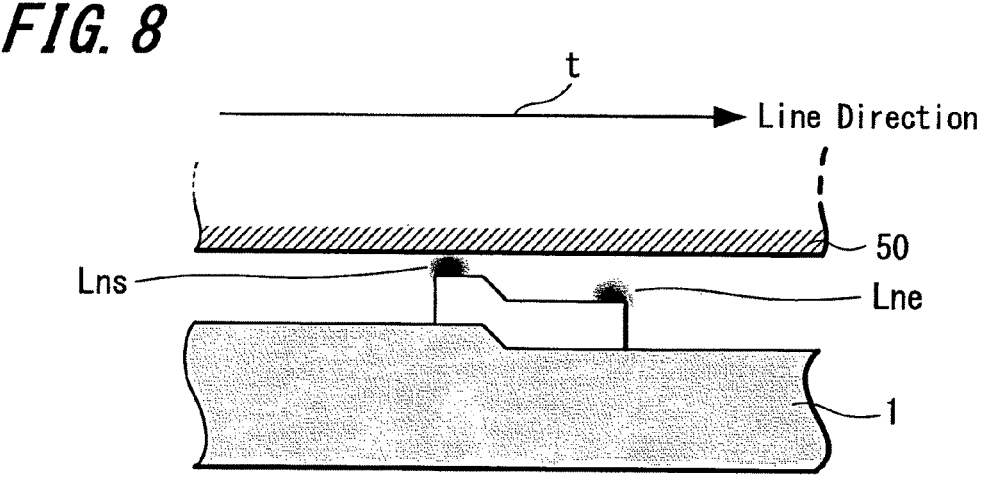
FIG. 8 is a schematic side view showing an arrangement of a scatterer for use with an optical near-field generating device according to an embodiment of the present invention.
Figure 9:
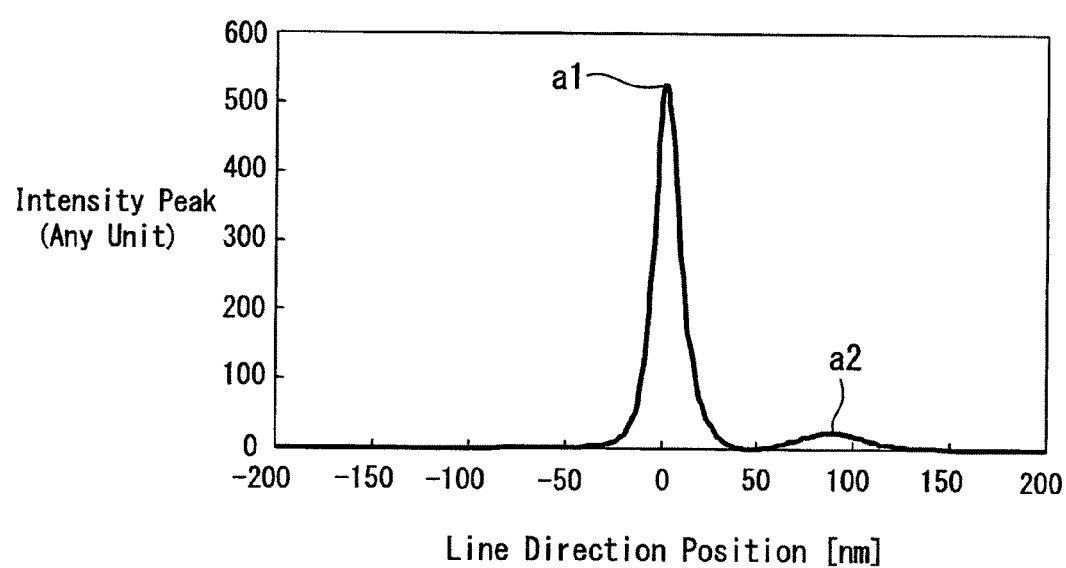
FIG. 9 is a diagram showing optical near-field peak intensity distribution relative to a position along a line extended in the longitudinal direction of the scatterer.

Compared and evaluated results obtained when SNRs of respective scatterers of an example and a comparative example were measured will be described below. Here, as shown in FIG. 8, an optical near-field Lns as recording light applied to the object 50 used as an information recording medium is signal light and the other optical near-field Lne not for use is noise light. Then, as shown in FIG. 9, a ratio (a1/a2) of intensity peak value a1 of the optical near-field Lns to intensity peak value a2 of the optical near-field Lne was evaluated as SNR. The horizontal axis in FIG. 9 represents a position in the line direction shown by an arrow t in FIG. 8.

Figure 10:
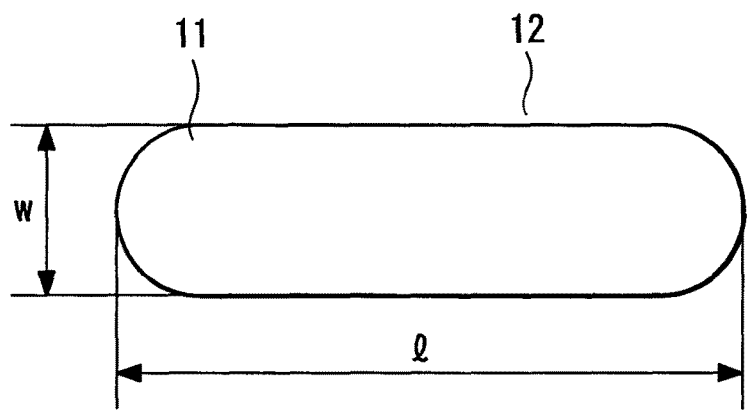
FIG. 10 is a schematic plan view showing an arrangement of an example of a scatterer.
Figure 11A:
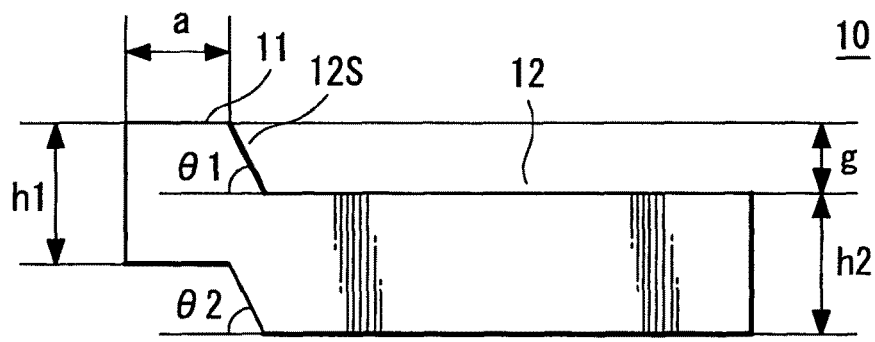
FIG. 11A is a schematic side view showing an arrangement of a scatterer for use with an optical near-field generating device according to an embodiment of the present invention.
Figure 11B:
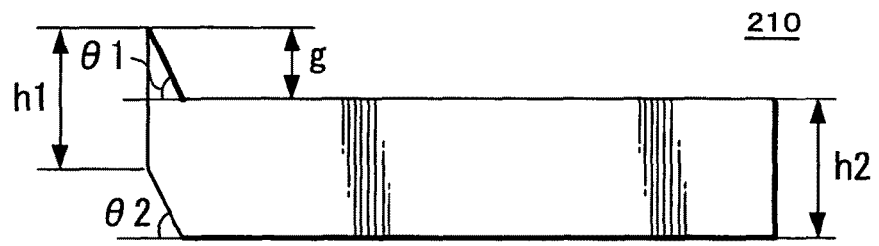
FIG. 11B is a schematic side view showing an arrangement of a scatterer according to a comparative example.

Scatterers having different optical near-field generating areas in shape were prepared for examples and comparative examples and analyzed. FIG. 10 shows a planar shape of the scatterers and FIGS. 11A and 11B show a shape of side surfaces of the scatterers, respectively. The scatterers of the example and the comparative example were each formed as a rod-like planar shape as shown in FIG. 10 and had the width of 24 nm represented by w and the length of 100 nm represented by l. Further, as shown in FIGS. 11A and 11B, h1 represents the thickness of one end portion of the optical near-field applying area (the first area 11 in the example), h2 represents the thickness of the other end portion (the second area 12 in the example) and g represents a level difference between the first and second areas 11 and 12. The respective scatterers of the example and the comparative example may have h1=h2=30 nm and g=20 nm. Further, θ1 represents an angle of the level difference 12S of the example and an angle of the comparative example at its inclined plane facing the surface of the object, θ2 represents an angle of the rear plane of both the example and comparative example, and θ1=θ2=45° is obtained in both the example and the comparative example. a represents a length in the longitudinal direction of the area applying an optical near-field, and a is 10 nm in the example and a is 0 in the comparative example. Specifically, according to the comparative example, the scatterer was shaped to have a vertex formed of an acute angle toward the object. It should be noted that, both in the example and the comparative example, the substrate was made of $SiO_2$, the scatterers 10 and 210 were made of Au, the recording film of the information recording medium was made of TbFeCo and a wavelength of light from the light source was selected to be 780 nm.

Figure 12:
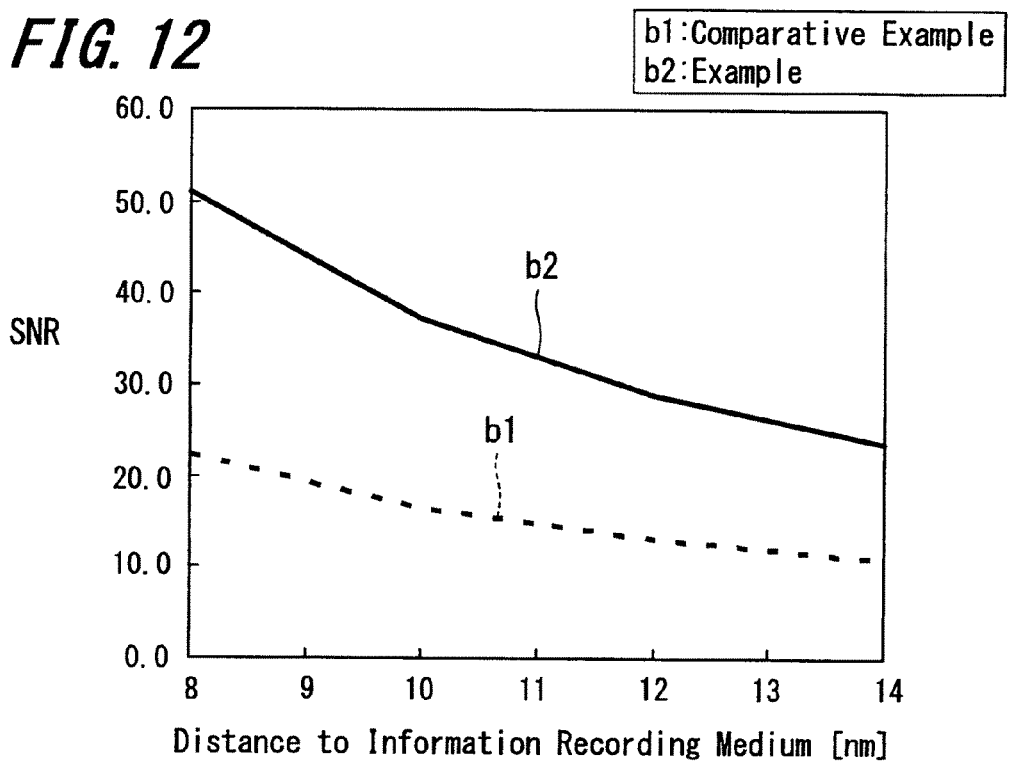
FIG. 12 is a diagram showing the change in SNR (signal-to-noise ratio) relative to a space between respective scatterers of an example and a comparative example and an information recording medium.

With respect to each of the scatterers of the example and comparative example, while a distance between the optical near-field generating area and the information recording medium was being changed, intensity distribution on the surface of the information recording medium was analyzed by the FDTD method, thereby SNRs being measured. In FIG. 12, a broken line b1 shows measured results of the comparative example and a solid line b2 shows measured results of the example. According to FIG. 12, the example using the scatterer that has the optical near-field generating area shaped like a plane could obtain high SNRs at any of the distances.

As a method of improving SNR, the optical near-field generating area not for use has been away from the information recording medium in related art. As shown in those results, however, in order to obtain the same SNR, the example having the optical near-field generating area for use shaped like a plane has a shorter distance from the information recording medium. Therefore, an amount of difference for the level difference provided on the substrate can be reduced, in other words, a time for treatment such as etching can be reduced in the example, which shows improvement in productivity as compared to the comparative example.

Figure 13:
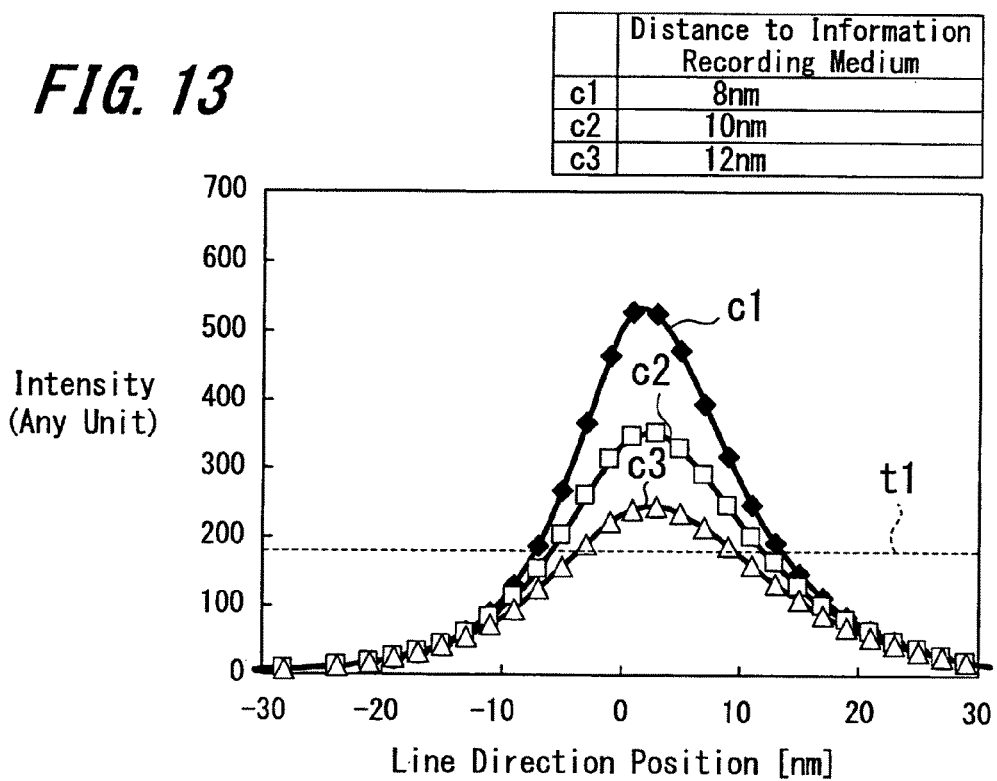
FIG. 13 is a diagram showing optical near-field intensity distribution relative to a position in a line direction.
Figure 14:
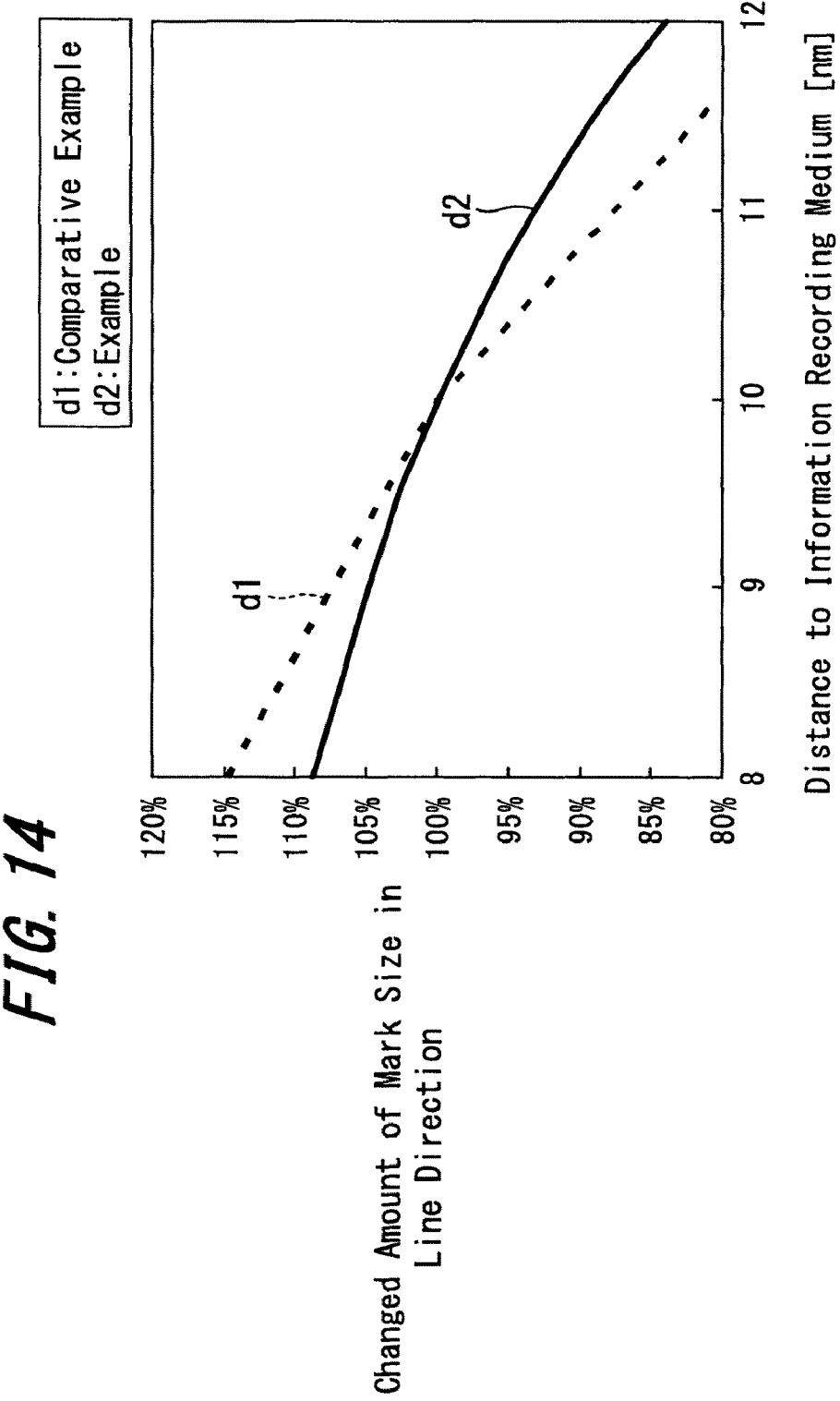
FIG. 14 is a diagram showing the amount of change of mark size in a line direction relative to a space between respective scatterers of an example and a comparative example and an information recording medium.

Next, results obtained when stability of magnetic recording mark sizes were evaluated in the case where an embodiment of the present invention would be applied to a magnetic recording system information recording and reproducing apparatus. Here, analysis is made on the basis of magnetic recording marks being formed at a position in which light intensity becomes higher than a certain threshold value. As shown in FIG. 13, when a distance between an optical near-field generating area and an information recording medium changes, a light intensity distribution on the surface of the information medium changes. Solid lines c1, c2 and c3 show the cases in which a space between the information recording medium and the optical near-field generating area of the scatterer was changed to 8 nm, 10 nm and 12 nm, respectively. Since the degree of change in the space varies depending on the shape of the optical near-field generating area, difference in the space was evaluated as the changed amount of the mark size. The scatterers according to the above example and comparative example shown in FIG. 10 and FIGS. 11A and 11B were used. A threshold value for forming recording marks was selected to be half the light intensity distribution peak value obtained when a distance between the optical near-field generating area and the information recording medium was 10 nm. FIG. 14 shows obtained results. In FIG. 14, the horizontal axis represents a space between an optical near-field generating area and an information recording medium, and the vertical axis represents an amount of change of a mark size along the line direction (direction extending along recording tracks). In FIG. 14, a broken line d1 shows measured results of the comparative example and a solid line d2 shows measured results of the example. As shown in FIG. 14, degree of variability of the example having an optical near-field generating area shaped like the plane is lower than that of the comparative example. Specifically, recording mark sizes can be recorded more stably in the example.

Figure 15A:
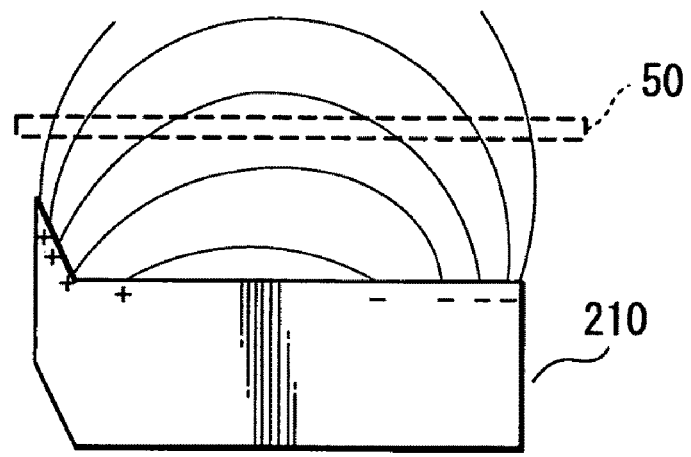
FIGS. 15A and 15B are diagrams showing distribution of electric lines of force generated on respective scatterers according to a comparative example and an example, respectively.
Figure 15B:
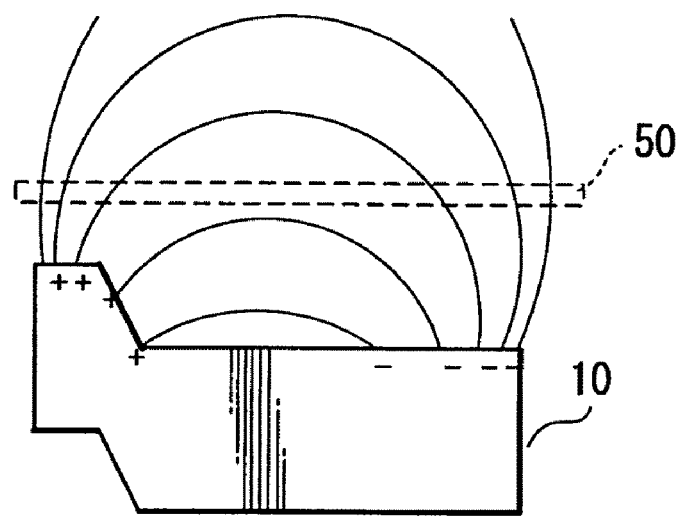

The followings describe the reasons. FIGS. 15A and 15B schematically show electric charge distributions in the comparative example and the example and electric lines of force generated by these electric charge distributions. As shown in FIG. 15A, since the comparative example has the optical near-field generating area having a vertex with an acute angle, electric charges are intensively distributed on the inclined plane forming the vertex. On the other hand, as shown in FIG. 15B, in the case of the example, electric charges are intensively distributed within the plane. Since electric lines of force extend radially from the surface in which electric charges are intensively distributed, density of electric lines of force becomes relatively low on the surface of the information recording medium 50 in the comparative example and density of electric lines of force becomes relatively high on the surface of the information recording medium 50 in the example. Since intensity of light is in proportion to density of electric lines of force, the optical near-field generating area having a planar shape can easily focus light on the narrower area.

Figure 16:
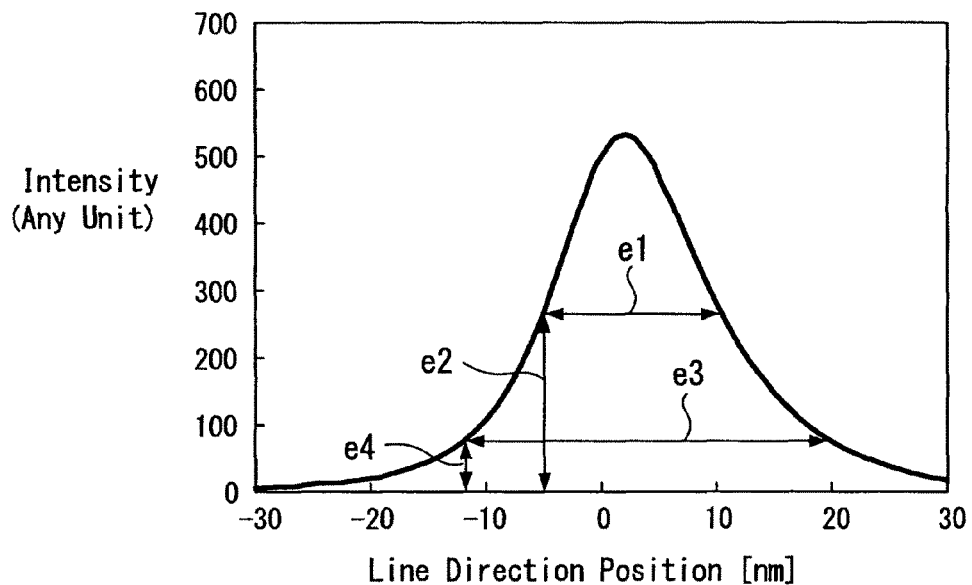
FIG. 16 is a diagram showing optical near-field intensity distribution relative to a position in a line direction.
Figure 17:
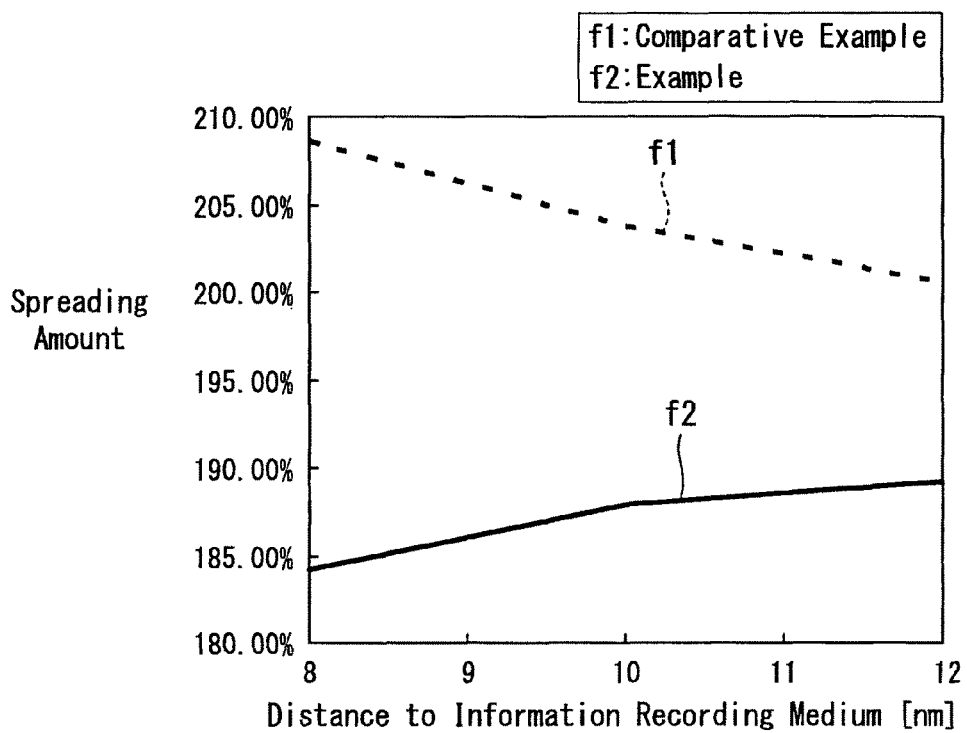
FIG. 17 is a diagram showing spreading amount of electric lines of force relative to a space between respective scatterers of a comparative example and an example and an information recording medium.

Results obtained when spreading electric lines of force were evaluated from another point of view will be described next. With respect to a beam spot having intensity distribution as shown in FIG. 16, the following equation is defined:

$$(1/e^2 \text{ intensity width}) \div (\text{FWHM}) = (\text{spreading amount})$$

where FWHM (Full Width at Half Maximum) represents a width (shown by an arrow e1) of an area which is half (shown by an arrow e2) the intensity peak value and $1/e^2$ intensity width represents a width (shown by an arrow e3) which is $1/e^2$ (shown by an arrow e4) of the intensity peak value. Then, the aforementioned comparative example and example shown in FIG. 10 and FIGS. 11A and 11B were analyzed. FIG. 17 shows the results.

According to the above-described definition, since the intensity distribution will be steep as the spreading amount becomes small and close to 100%, ideally it is desirable that intensity distribution should be shaped like stepwise intensity distribution (specifically, spreading amount is equal to 100%). For example, when heat-assisted magnetic recording is carried out, rapid heating and cooling with excellent selectivity of irradiated area become possible. As shown in FIG. 17, the result, shown by a solid line f2, of the example is improved as compared to the result, shown by a broken line f1, of the comparative example from this view point.

When it is intended to generate more intensive optical near-fields from the optical near-field generating device according to an embodiment of the present invention, the scatterer may be formed to have a shape the width of which is gradually reduced toward a tip end portion of the first area which generates an optical near-field. Further, when it is intended to lower intensity of an optical near-field not for use in the second area, it is desirable that the scatterer should be formed to have the planar shape of the second area without an acute angle portion. Electric charges concentrate on the portion which gradually reduces its width to become an acute angle shape with the result that density of electric lines of force increases.

Further, when comparing cross-sectional shapes in the thickness direction of the scatterer, a thinner area can generate the more intensive optical near-field than a thick area. Accordingly, in the optical near-field generating device according to an embodiment of the present invention, it is desirable that the thickness h1 of the first area which generates an optical near-field in the scatterer should be less than the thickness h2 of, particularly, the end portion of the second area, that is, $h1 \leq h2$ should be satisfied as shown in the above equation (1). FIG. 18A is a schematic side view of a scatterer according to a comparative example in which one end of the scatterer that generates an optical near-field not for use is reduced in thickness. FIG. 18A shows a scatterer 220 in which a first area 221 that generates an optical near-field is a flat surface and in which a second area 222 that generates an optical near-field not for use is thinner than the first area 221. At that time, as compared with surface plasmon coupling generated between the upper surface and the lower surface of the relatively thick first area 221 as shown by an arrow g1, surface plasmon coupling between the upper surface and the lower surface of the second area 222 becomes stronger as shown by an arrow g2, thereby intensity of the optical near-field being increased. As a result, SNR of the output of the first area 221 to that of the second area 222 will be lowered. On the other hand, as shown in FIG. 18B, in the scatterer according to an embodiment of the present invention, since the second area 12 is not made thinner than the first area 11, intensity of the optical near-field not for use can be suppressed and it is possible to avoid SNR from being lowered. With respect to the SNR, a scatterer 220 having a shape shown in FIG. 19 was used as a comparative example and the SNRs were compared based on the FDTD method.

In this case, as compared with the example shown in FIGS. 10 and 11A, the scatterer 220 according to the comparative example shown in FIG. 19 has a length l in the longitudinal direction, a width w, an angle θ1 of the slope on the upper surface, a thickness h2 of the end portion of the second area, a length a in the longitudinal direction of the first area and a difference of unevenness g between the first area and the second area, which were selected to be the same conditions. Specifically, in both the example and the comparative example were given the following conditions:

l=95 nm
w=24 nm
θ1=45°
h2=30 nm
a=10 nm
g=20 nm

In addition, $SiO_2$ was selected as the material for both the substrates in the example and the comparative example. Gold (Au) was selected as the material for both the scatterers in the example and the comparative example. TbFeCo was selected as the material for the recording films of the information recording mediums in both the example and the comparative example. Wavelength of light of the light sources in both the example and the comparative example was selected to be 780 nm.

On the other hand, the thickness h1 of the end portion of the first area was selected to be h1=50 nm (that is, h1>h2) in the scatterer 220 according to the comparative example and the thickness h1 of the end portion of the first area was selected to be h1=30 nm (that is, h1=h2) in the scatterer 10 according to the example. Further, the lower surface of the scatterer 220 according to the comparative example was formed to be flat and in the example, an angle θ2 formed by the inclination of the level difference portion was selected to be θ2=45°.

While the intensity distribution peak values and the FWHM of intensity distributions become substantially the same values in the example and in the comparative example, SNR=30 and in the example, SNR=49. Hence, it can be confirmed that the example in which the thickness of the first area is not thicker than that of the second area may obtain excellent SNR.

In an actual manufacturing process, there may be a possibility that the thickness of the portion near the level difference of the substrate will be different from the thickness of the other portions depending on a metal stacking process. However, the difference in the thickness near the center of the scatterer may not affect SNR considerably. Here, the scatterer may be an electric dipole, and therefore electric charges are polarized largely to respective end portions relative to the direction of polarization of light incident on the scatterer and the thicknesses of such respective end portions are important. Specifically, from a SNR standpoint, it is important that the second area, particularly, the portion to generate an optical near-field which causes noise should not become thinner than the first area. The portion to generate an optical near-field which causes noise is typically the end portion on the opposite side to the first area to generate an optical near-field and therefore, a problem may not arise as long as a level difference is not provided near the optical near-field generating portion in the second area. Therefore, even if the thickness of the scatterer is changed in the direction of polarization, that is, in the longitudinal direction, such change of the thickness of the scatterer may not be a problem and at least the thicknesses at the respective ends may need to be substantially equal to each other.

In an information recording and reproducing apparatus using the optical near-field generating device according to an embodiment of the present invention, a conductor may be formed around the scatterer at least at part of the substrate. Then, electric current may be applied to the conductor, thereby configuring a magnetic field generating portion that generates a magnetic field to a portion near the first area. In this case, when formed on the substrate on which the scatterer is formed, the conductor is formed by patterning in such a manner that the portion, which generates a magnetic field with application of the electric current to the conductor, may overlap with the first area. Hence, such a magnetic head can be used in combination with ease. If the scatterer and the conductor being the magnetic field generating portion are made of the same material, there is an advantage that the scatterer and the magnetic field generating portion can be manufactured by the same deposition and patterning process.

In such arrangement, since respective distances to the scatterer and the magnetic field generating conductor are substantially the same as seen from the information recording medium, magnetic field perpendicular to the information recording medium can be generated from the scatterer at its first area which generates an optical near-field and hence heat-assisted perpendicular magnetic recording can be carried out. Further, since the scatterer and the conductor of the magnetic field generating portion are fabricated on the same substrate, they can be fabricated using a technology such as patterning technology in a state in which relative positions thereof are matched with high accuracy and hence an adjustment process to match the relative positions is not required.

Further, it is desirable that a distance from the recording area of the information recording medium to the first area of the scatterer should be made substantially uniform. However, an area with a uniform distance may lie within a range in which a perpendicular magnetic field component may be generated in the first area of the scatterer, and the above distance to the scatterer may be made uniform in a part of the conductor alone that serves as the magnetic field generating portion.

If the scatterer and the conductor of the magnetic field generating portion are made of the same material, then it becomes possible to manufacture the scatterer and the magnetic field generating portion, the heights of which are equal, by the same deposition and patterning processes. The scatterer and the conductor of the magnetic field generating portion may not be made of the same material depending on purposes and conditions in which they are in use. In addition, the thickness of the conductor of the magnetic field generating portion may be locally increased in order to lower a resistance value of the conductor of the magnetic field generating portion. In this regard, a conductive film may be locally fabricated in advance on the substrate only at its portion the thickness of which is increased. Alternatively, it is possible to add a process for stacking a conductive material only on a desired area of the magnetic field generating portion after the scatterer and the conductive pattern being the magnetic field generating portion are formed.

Further, the conductor being the magnetic field generating portion can be provided as a light-shielding film to prevent the object such as an information recording medium from being irradiated with incident light not for use among rays of light applied from the rear of the substrate by suitably selecting its pattern. Thus, among rays of light emitted from a light source, other light than incident on the scatterer can be suppressed so as not to reach the object such as an information recording medium. Accordingly, when an embodiment of the present invention is applied to the information recording and reproducing apparatus, there is an advantage that unfavorable influences exerted upon the information recording medium by thermal demagnetization can be suppressed efficiently.

Figure 20:
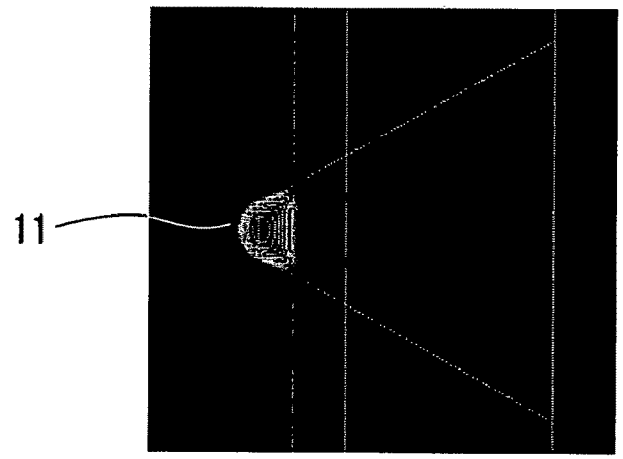
FIG. 20 is a diagram showing optical near-field distribution in an optical near-field generating device according to an embodiment of the present invention.
Figure 21:
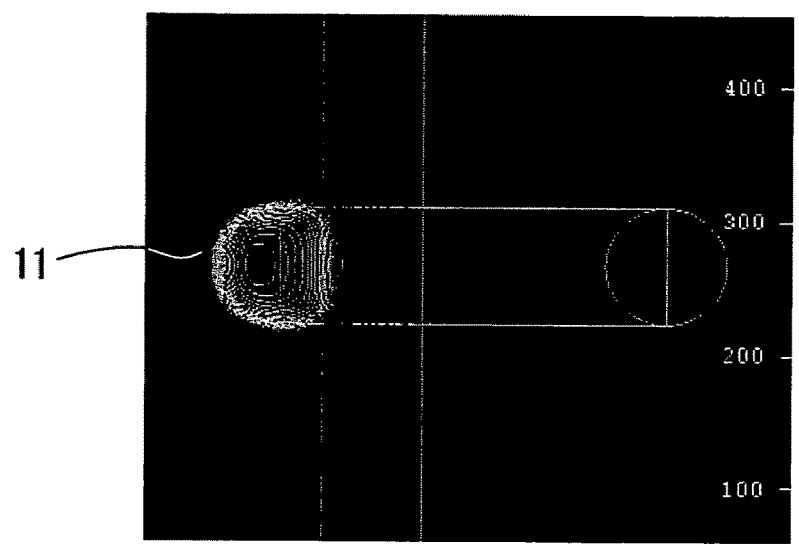
FIG. 21 is a diagram showing optical near-field distribution in an optical near-field generating device according to an embodiment of the present invention.

In the scatterer for use with the optical near-field generating device according an embodiment of to the present invention, if the first area is reduced, then the shape of the beam spot of an optical near-field reflects strongly the planar shape of the first area so that the shape of the beam spot may be easy to control. FIGS. 20 and 21 are microscopic representations showing analyzed results obtained when shapes of beam spots of the optical near-field were measured in which the length a in the longitudinal direction of the first area in the scatterer 10 shown in FIGS. 10 and 11A was selected to be 20 nm (a=20 nm). Both of FIGS. 20 and 21 show the shapes of beam spots on the surface of an object located at the position distant from the first area 11 with a distance of 8 nm. FIG. 20 shows an example of a shape of a beam spot the width of which is gradually reduced toward the end portion of the first area 11 and FIG. 21 shows an example of a shape of a beam spot which is semicircular in shape, respectively. As shown in the above two examples, when the area of the first area reaches the size of approximately 20 nm, the planar shapes and the shapes of the beam spots on the surface of the object become nearly equal to each other.

Figure 22:
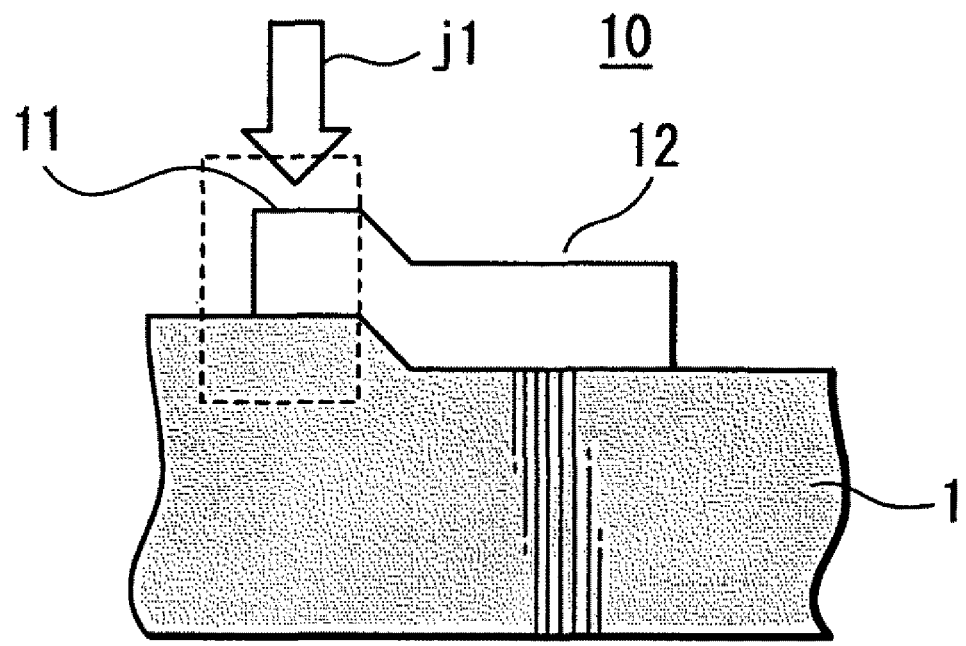
FIG. 22 is a schematic side view showing an arrangement of a scatterer for use with an optical near-field generating device according to an embodiment of the present invention.
Figure 23A:
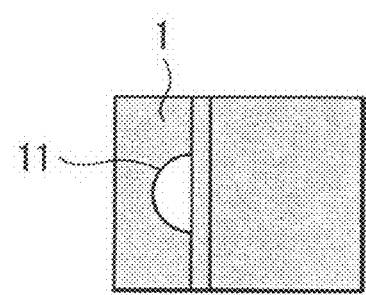
FIGS. 23A to 23F are schematic plan views showing arrangements of main portions of scatterers for use with an optical near-field generating device according to an embodiment of the present invention, respectively.
Figure 23B:
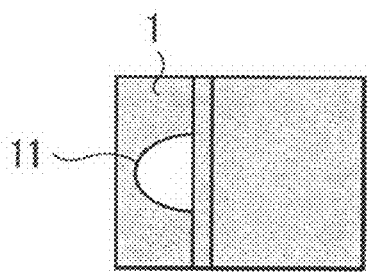
Figure 23C:
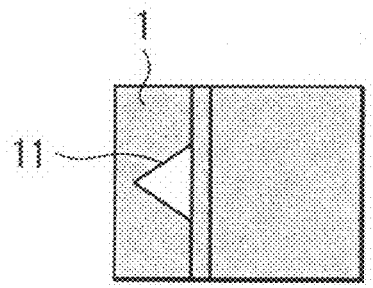
Figure 23D:
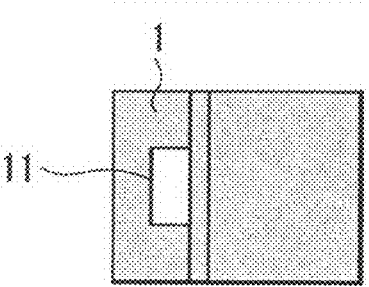
Figure 23E:
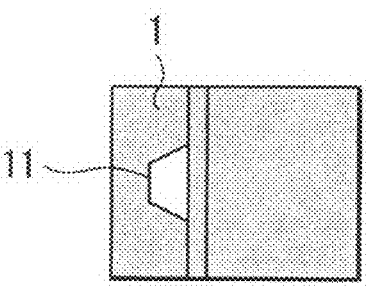
Figure 23F:
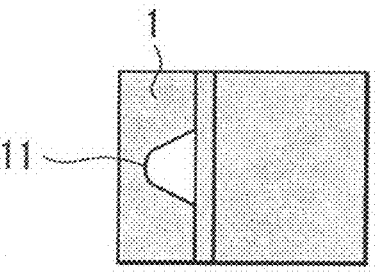

Next, respective examples of planar shapes of scatterers for use with the optical near-field generating device according to an embodiment of the present invention will be described. FIGS. 23A to 23F show respective examples of planar shapes of scatterers obtained when an area encircled by a broken line in FIG. 22 is seen from the direction shown by an arrow j1 in FIG. 22. In FIG. 22 and FIGS. 23A to 23F, elements and parts corresponding to those in FIG. 5 are denoted by the same reference numerals and therefore need not be described repeatedly. FIG. 23A shows an example of a planar shape formed as a part of a circle, for example, semicircular shape. FIG. 23B shows an example of a planar shape formed as a part of an ellipse. FIGS. 23C to 23E show examples of planar shapes formed as a triangle, a rectangle or a square and a part of polygon such as a hexagon, respectively. Further, FIG. 23F shows an example of a planar shape formed by combining a part of a circle and a part of a triangle and the width of which is reduced toward the tip end portion. As described above, the scatterer may have any planar shape formed by a circle, an ellipse and a part of a polygon or formed by a combination of these shapes. Therefore, the shape of the beam spot on the plane from which an optical near-field is generated or the shape most suitable for the manufacturing method can be selected suitably.

Figure 24:
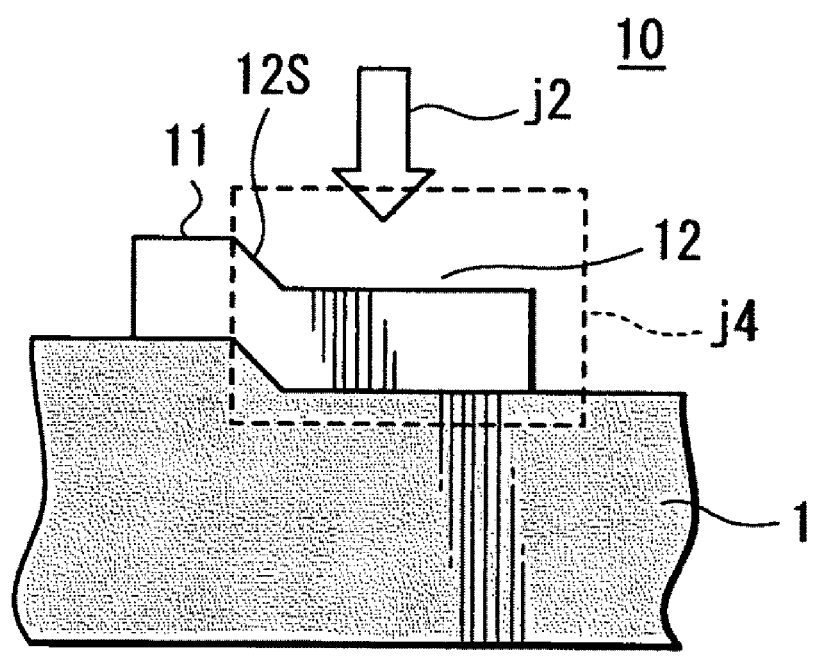
FIG. 24 is a schematic side view showing an arrangement of a scatterer for use with an optical near-field generating device according to an embodiment of the present invention.
Figure 25A:
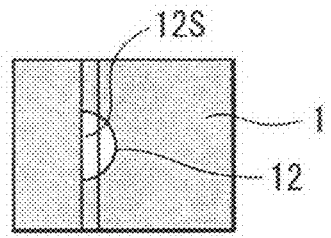
FIGS. 25A to 25G are schematic plan views showing arrangements of main portions of scatterers for use with an optical near-field generating device according to an embodiment of the present invention, respectively.
Figure 25B:
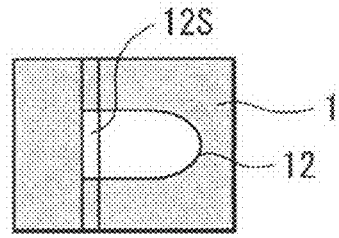
Figure 25C:
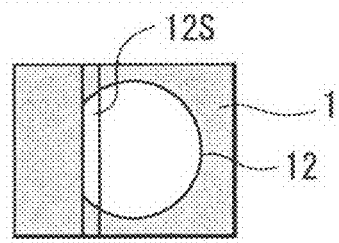
Figure 25D:
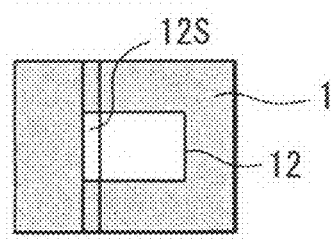
Figure 25E:
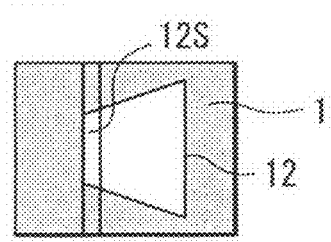
Figure 25F:
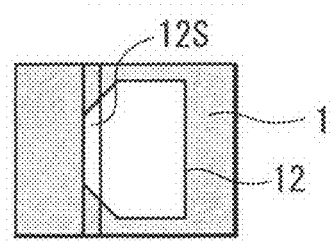
Figure 25G:
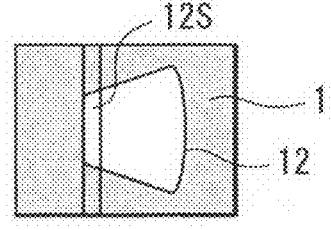

Similarly, the planar shape of the second area of the scatterer for use with the optical near-field generating device according to an embodiment of the present invention can be selected suitably. FIGS. 25A to 25G show respective examples of planar shapes of scatterers obtained when an area shown by a broken line in FIG. 24 is seen from the direction shown by an arrow j2 in FIG. 24, respectively. In FIG. 24 and FIGS. 25A to 25G, elements and parts corresponding to those in FIG. 5 are denoted by the same reference numerals and therefore need not be described repeatedly. A planar shape of the second area may be formed as a semicircle as shown in FIG. 25A. A planar shape of the second area may be formed as a rod and the tip end portion of which may be formed as a semicircle as shown in FIG. 25B. Alternatively, as shown in FIG. 25C, a planar shape of the second area may be formed as shape which results from removing part of a circle. In addition, as shown in FIG. 25D, a planar shape of the second area may be formed as a part of a rectangle. As shown in FIG. 25E, a planar shape of the second area may be formed as a shape which results from removing part of a triangle. As shown in FIG. 25F, a planar shape of the second area may be formed as a shape obtained by combining a rectangle and a part of a triangle. Further, as shown in FIG. 25G, a planar shape of the second area may be formed as a fan-like shape. As described above, the planar shape of the second area may be formed by a combination of any shapes such as a part of a circle, a part of an ellipse, a polygon or a fan-like shape.

It should be noted that, when it is intended to generate an intensive optical near-field, the scatterer may be shaped so as to obtain a focusing effect by forming the first area to have a planar shape the width of which is gradually reduced toward the tip end portion thereof. Further, when it is intended to lower the intensity of an optical near-field not for use at the end portion of the second area, it is desirable that the planar shape of the scatterer should be formed without an acute angle portion or without narrowed area at the end portion of the second area so that a focusing effect may not be obtained on such portion.

Next, results obtained when the shape in the thickness direction of the scatterer was examined will be described.

Figure 26:
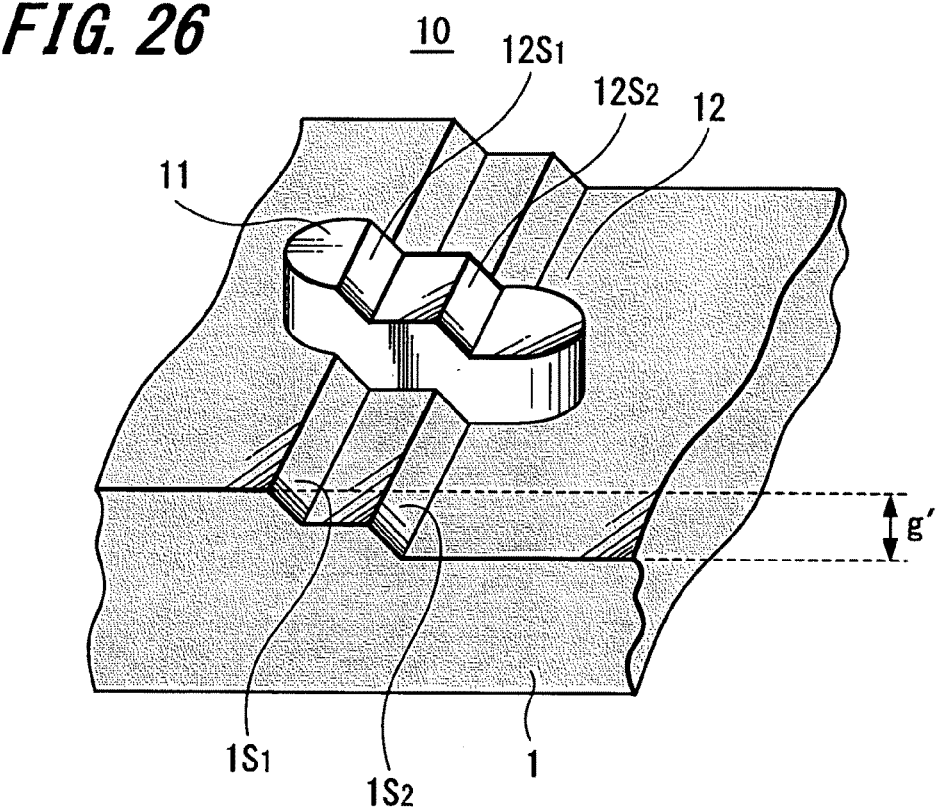
FIG. 26 is a schematic perspective view showing an arrangement of a scatterer for use with an optical near-field generating device according to an embodiment of the present invention.

A scatterer for use with the optical near-field generating device according to an embodiment of the present invention may have an arrangement in which the scatterer may be formed across three or more planes with different heights on a substrate. FIG. 26 is a perspective view schematically showing main portions of an example of a scatterer obtained in that case. As shown in FIG. 26, in this case, a rod-like scatterer 10 is formed across level differences $1S_1$ and $1S_2$ provided on the substrate 1 and level differences of multiple-steps are provided on the second area 12. When a level difference of one step alone is provided on the second area 12 as earlier noted in FIG. 5, an amount of level difference is limited by the thickness of the scatterer 10. On the other hand, as shown in FIG. 26, the level differences of two or more steps may be provided on the substrate 1 and the scatterer 10 is formed across three or more planes with different heights. Accordingly, the end portion generating an optical near-field not for use on the second area 12 can be located sufficiently distant from the object regardless of the thickness of the scatterer 10 and SNR can be improved. Further, as the number of the level differences of the scatterer 10 increases, that is, the number of the level differences provided on the substrate 1 increases, it is possible to reduce a height difference per step to maintain a height difference between the first area 11 and the end portion generating an optical near-field not for use on the second area 12 of the scatterer 10. Since electric charges can move on the surface of the scatterer 10 more smoothly as the height difference between the level differences is reduced, surface plasmons can be excited efficiently so that the optical near-field generating device becomes able to generate the more intensive optical near-field.

Figure 27:
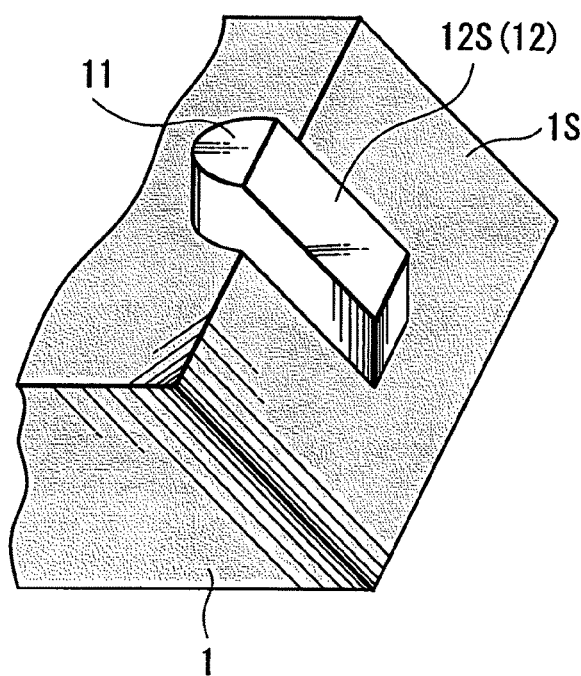
FIG. 27 is a schematic perspective view showing an arrangement of a scatterer for use with an optical near-field generating device according to an embodiment of the present invention.

In addition, as shown in FIG. 27, the scatterer for use with the optical near-field generating device according to an embodiment of the present invention can be formed across one or more planes provided on the substrate 1 and one or more inclined planes inclined relative to this plane, in the illustrated example, an inclined plane 1S. In the case of the above-mentioned arrangement, the first area 11 and the end portion of the second area 12 of the scatterer 10 can be apart from each other with the result that the area generating an optical near-field not for use can be located more distant from the object. The second area 12 is made of the level difference 12S alone. However, since the second area 12 need not be formed as a plane parallel to the surface of the object such as an information recording medium, a part of the surface of the substrate 1 may be cut away or a concave portion is provided on an end portion thereof to obtain the side surface as the inclined plane, then the arrangement shown in FIG. 27 can be manufactured with ease.

Next, results obtained when angles required to obtain height differences in the scatterer for use with the optical near-field generating device according to an embodiment of the present invention were examined will be explained. In this case, changes of characteristics were evaluated while the aforementioned angle θ1 of the upper side inclined plane facing the object of the level difference 12S and the angle θ2 of the lower side inclined plane shown in FIGS. 10 and 11A were being changed. It should be noted that the length a in the longitudinal direction of the first area 11, the width w, thicknesses h1 and h2 and the height difference g of the level difference 12S were selected as follows. A distance between the first area 11 and the object 10, in this case, a distance between the first area 11 and the surface of the information recording medium was selected to be 8 nm. A wavelength of light from the light source was selected to be 780 nm. SiO$_2$ was selected for the material of the substrate 1, Au was selected for the material of the scatterer 10 and TbFeCo was selected for the material of a recording film of the information recording medium.

a=10 nm
w=24 nm
h1=h2=30 nm
g=20 nm

Changes of the characteristics were analyzed in the state in which the length (=resonator length) l in the longitudinal direction of the scatterer 10 was changed in a range of 85 nm to 100 nm and the above-described angles θ1 and θ2 were selected to be θ1=θ2 and were changed to 45°, 60° and 75°, respectively.

Figure 28:
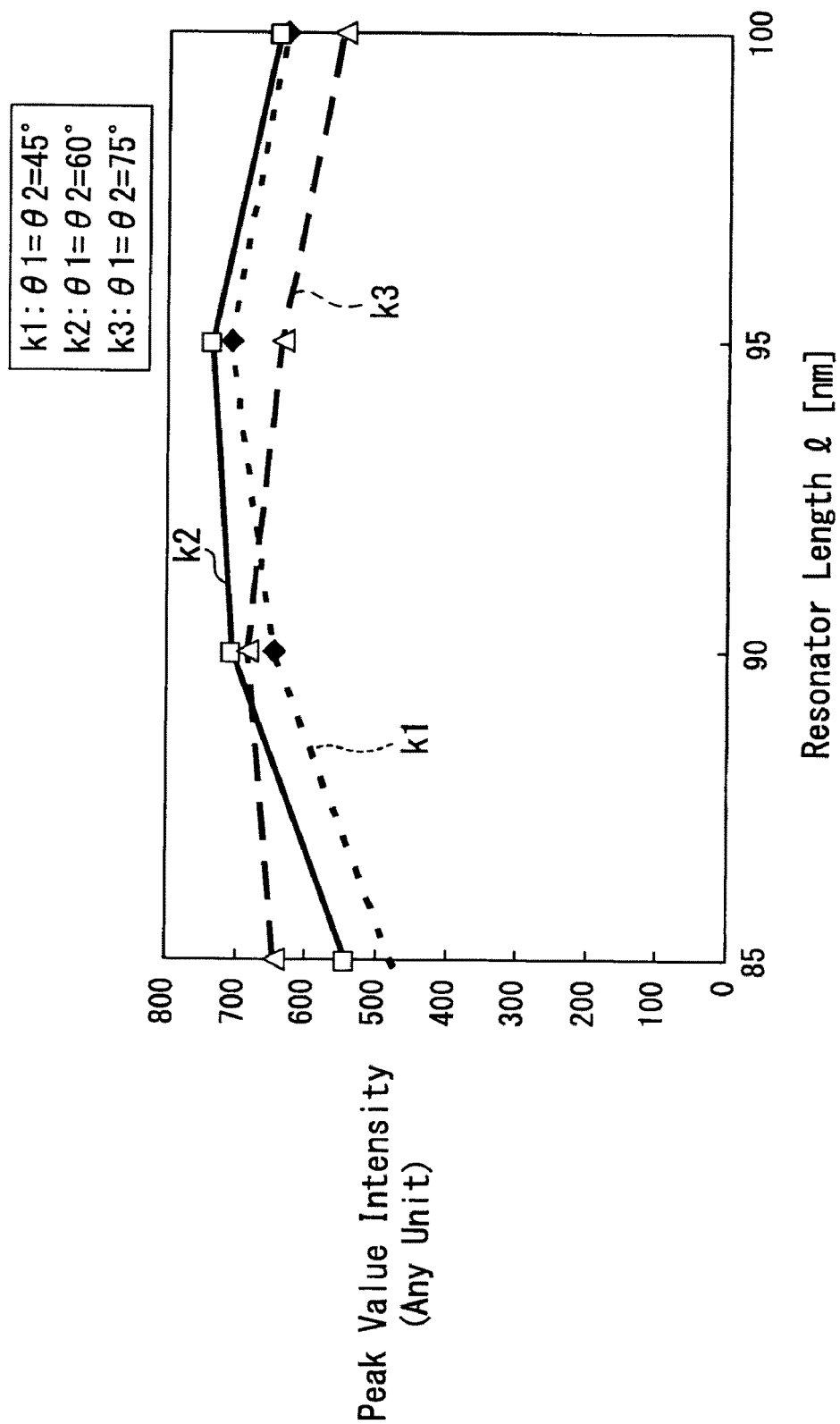
FIG. 28 is a diagram showing the change in peak value intensity of a scatterer relative to a resonator length according to an embodiment of the present invention.
Figure 29:
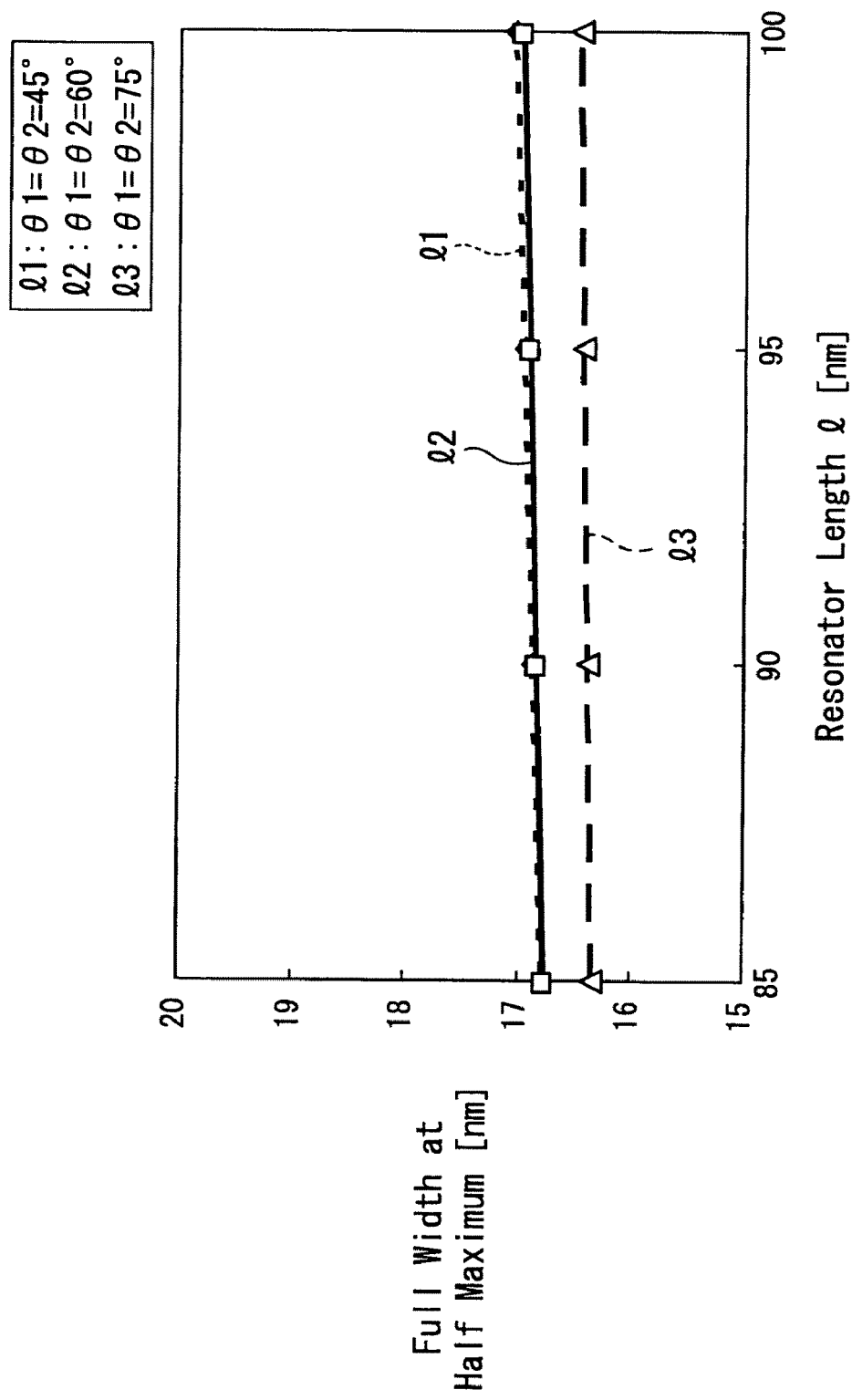
FIG. 29 is a diagram showing the change in full width at half maximum of a scatterer relative to a resonator length according to an embodiment of the present invention.
Figure 30:
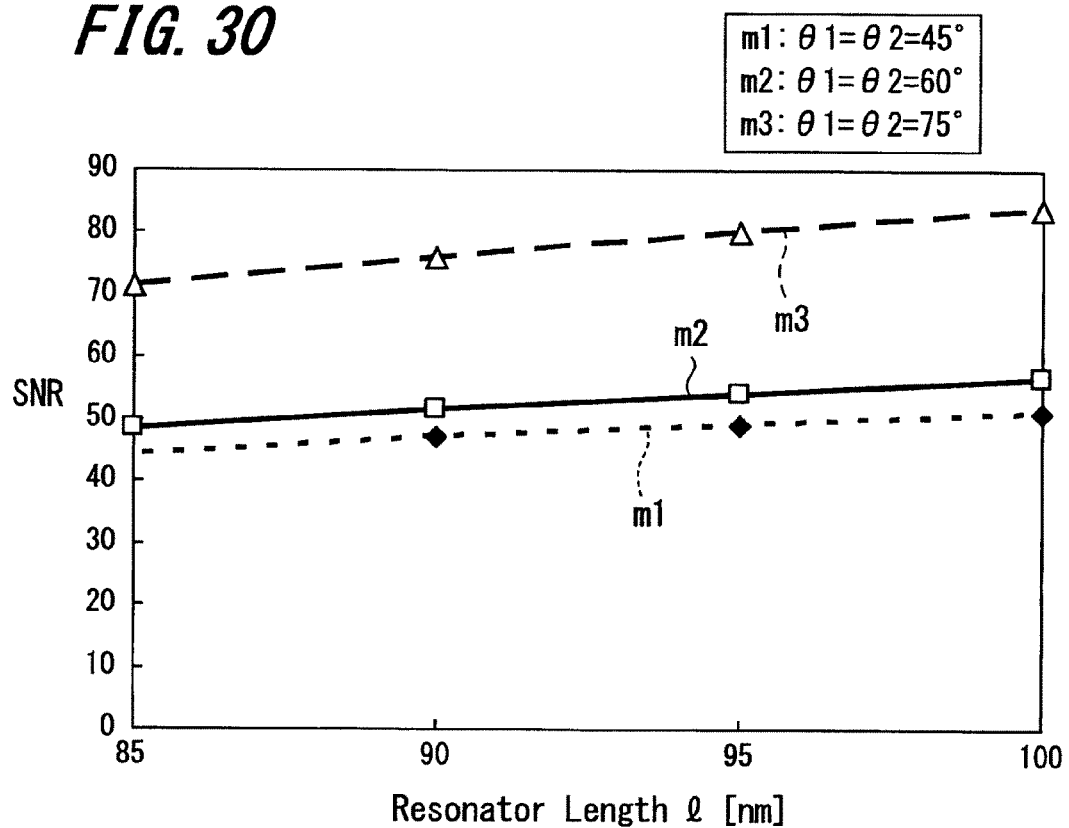
FIG. 30 is a diagram showing the change in SNR of a scatterer relative to a resonator length according to an embodiment of the present invention.

FIGS. 28, 29 and 30 show results obtained when the peak value intensity, full width at half maximum (FWHM) and SNR were analyzed under the above-mentioned conditions. As shown in FIG. 28, since the peak value intensity was not changed considerably in the range of the resonator length l adjusted so that the peak value intensity may become highest, the angle θ1 ranging of from 45° to 75° need not be controlled severely. Having compared peak values, the highest peak value was obtained when the angle θ1 was 60° (θ1=60°) and the resonator length l was 95 nm (l=95 nm).

Figure 31:
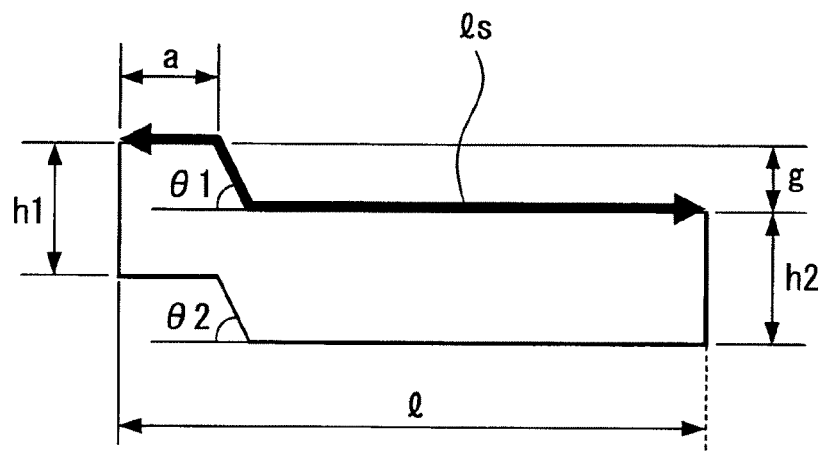
FIG. 31 is a schematic diagram showing an arrangement of a scatterer for use with an optical near-field generating device according to an embodiment of the present invention.

Further, as shown in FIG. 28, the value of the resonator length l in which the intensity may have a peak tends to be reduced as the angle θ1 increases. FIG. 31 show parameters such as lengths of respective portions of the scatterer 10 and a length of the surface of the scatterer 10 facing the object is shown by an arrow is in FIG. 31. In FIG. 31, elements and parts corresponding to those of FIGS. 10 and 11A are denoted by the same reference numerals and therefore need not be described repeatedly. The surface length ls can be expressed as:

$$ls=l-g/\tan(\theta 1)+g/\sin(\theta 1)$$

Specifically, while the value of the resonator length l is not changed, the surface length ls of the scatterer 10 in which surface plasmons exist substantially increases as the inclination angle θ1 of the level difference 12S increases. Accordingly, as set forth above, as the inclination angle θ1 increases, the resonator length l with the peak intensity value reduces.

Having compared FWHM of intensity distributions based on FIG. 29, FWHM tends to be reduced as the inclination angle θ1 increases, but FWHM may not change considerably. Further, as shown in FIG. 30, SNR can be improved as the inclination angle θ1 increases. In addition, effects of such improvements are strong when the inclination angle is 60° or more.

From the above-mentioned results, it is clear that, in order to produce stable shapes of beam spots, the inclination angle need not be controlled strictly because influences exerted when the inclination angle θ1 of the level difference 12S of the scatterer 10 is varied is relatively small. Therefore, it is possible to manufacture the scatterer with sufficiently high performance in actual practice using an etching process without anisotropy or the like. Under the environments in which the inclination angle θ1 can be controlled, it is desirable that θ1>60° should be satisfied from a SNR standpoint and an FWHM standpoint. When the peak value intensity is regarded as important, it is preferable that the inclination angle θ1 should be selected as approximately θ1=60°.

Figure 32A:
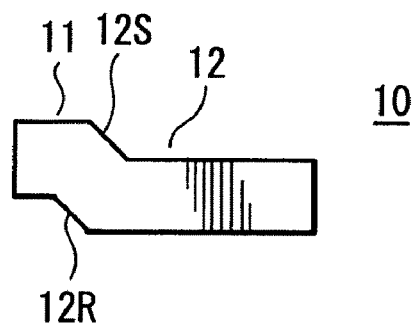
FIGS. 32A to 32D are schematic perspective views showing arrangements of scatterers for use with an optical near-field generating device according to an embodiment of the present invention, respectively.
Figure 32B:
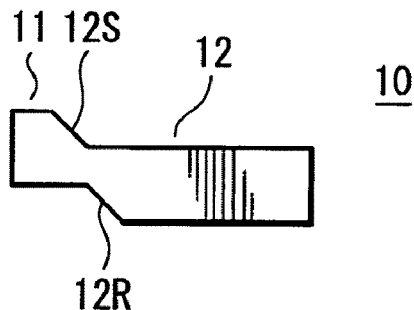
Figure 32C:
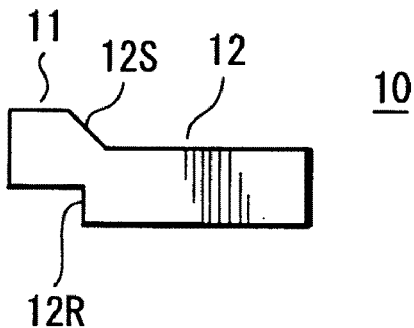

Next, examples obtained when the thickness of scatterers for use with the optical near-field generating device according to an embodiment of the present invention was changed will be described. FIGS. 32A to 32D are side views schematically showing respective examples of scatterers. In the actual manufacturing process, if the level difference is provided on the substrate beforehand and a metal film is formed thereon to form the scatterer 10, the shape of the level difference of the substrate and the shape of the level difference of the surface of the scatterer 10 facing the object are not always matched with each other depending on deposition methods and deposition conditions. FIG. 32A shows an example in which the thickness of the level difference 12S is caused to increase in relative to the position at which the level difference 12R of the substrate is located. FIG. 32B shows an example in which the thickness of the level difference 12S is caused to reduce in relative to the position at which the level difference 12R of the substrate is located. Further, FIG. 32C shows an example in which the angle of the level difference 12S is different from that of the level difference 12R of the substrate and illustrates a case in which the level difference 12R of the substrate is substantially perpendicular and the level difference 12S facing the object is formed as an inclined plane with an angle of about 45°.

As set forth above, in the optical near-field generating device according to an embodiment of the present invention, it is desirable that the thickness h1 of the optical near-field generating portion, that is, the first area and the thickness h2 of the end portion in the second area which generates an optical near-field not for use should be selected so as to satisfy h1>h2. The thickness between those thicknesses h1 and h2 are not limited except the case in which the thickness is extremely small as compared with the thicknesses h1 and h2.

Figure 32D:
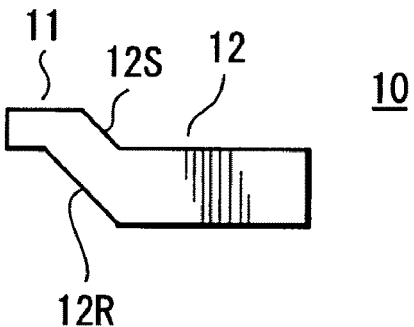

Further, in the second area, it is desirable that the thickness h2 should be larger than the thickness h1 in such a manner that the focusing effect may not be obtained in the thickness direction. As shown in FIG. 32D, for example, if the thickness of the end portion of the second area is made thicker than that of the first area so as to satisfy h1<h2, then it is possible to improve SNR.

Metals such as Au, Pt, Ag, Cu, Al, Ti, W, Ir, Pd, Mg and Cr, semiconductors such as Si and GaAs and conductive materials such as carbon nanotubes can be used as the material for the scatterer. Further, the scatterer may not be formed with a single material but may contain a plurality of conductive materials such as those described above. It is desirable that the substrate on which the scatterer is formed should be made of a material having transmittance in wavelengths for use in order that light is efficiently incident on the scatterer through the substrate, desirably the substrate should be made of a material the transmittance of which is 70% or more. For example, IV-group semiconductors such as Si and Ge, III-V-group compound semiconductors represented by GaAs, AlGaAs, GaN, InGaN, InSb, GaSb and AlN, II-VI-group compound semiconductors such as ZnTe, ZeSe, Zns and ZnO, oxide insulators such as ZnO, $Al_2O_3$, $SiO_2$, $TiO_2$, $CrO_2$ and $CeO_2$, nitride insulators such as SiN, glass, plastic and the like can be used as the material of the substrate. Further, in order to improve adhesion between the scatterer and the substrate, it is desirable that an adhesion layer (intermediate metal layer) formed of a material such as Zn, Ti, Cr and Al should be formed between the scatterer and the substrate made of oxide insulator or nitride insulator. As a result, the scatterer can be prevented from peeling off the substrate, strength of the scatterer can be improved and a product life of the scatterer can be made long.

Figure 33:
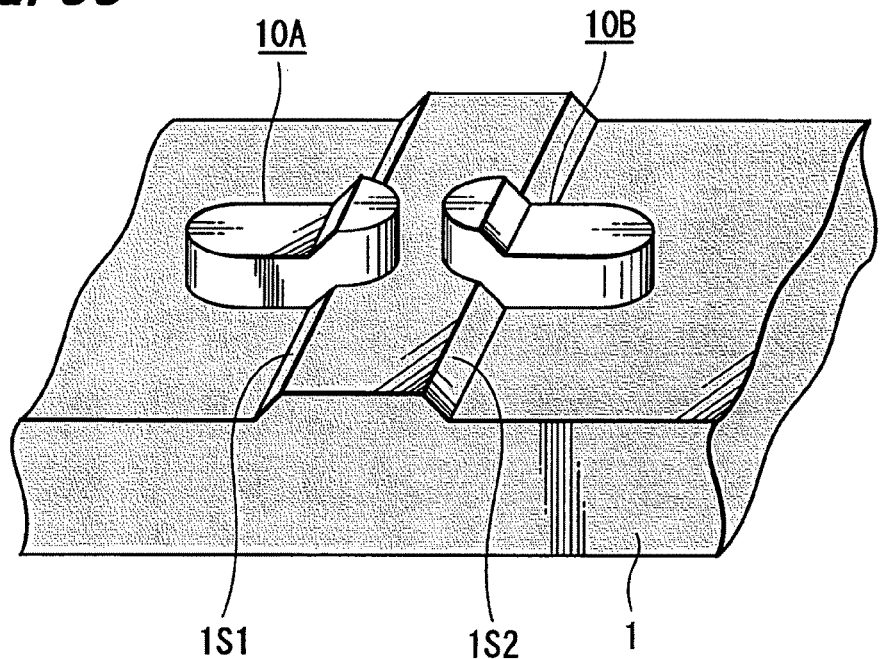
FIG. 33 is a schematic perspective view showing an arrangement of a scatterer for use with an optical near-field generating device according to an embodiment of the present invention.

In order to increase an intensity of optical near-field, another scatterer having conductivity may be formed separately on the substrate at a portion near the first area of the scatterer. FIG. 33 is a perspective view schematically showing an example of this case. As shown in FIG. 33, first and second scatterers 10A and 10B are located on the substrate 1 such that first areas thereof to generate an optical near-field may be made close to each other. In this example, a ridge-like convex portion is provided on the substrate 1 and the first scatterer 10A formed across the level difference 1S1 and the second scatterer 10B formed across the level difference 1S2 are located in a manner described above.

Here, if a space between the first areas of the first and second scatterers 10A and 10B is selected to be equal to or less than a wavelength of light applied from the light source, then electric charges concentrated in the first area of the first scatterer 10A and electric charges concentrated in the first area of the second scatterer 10B act on each other to cause an intensive optical near-field to be generated between the two scatterers 10A and 10B.

Figure 34:
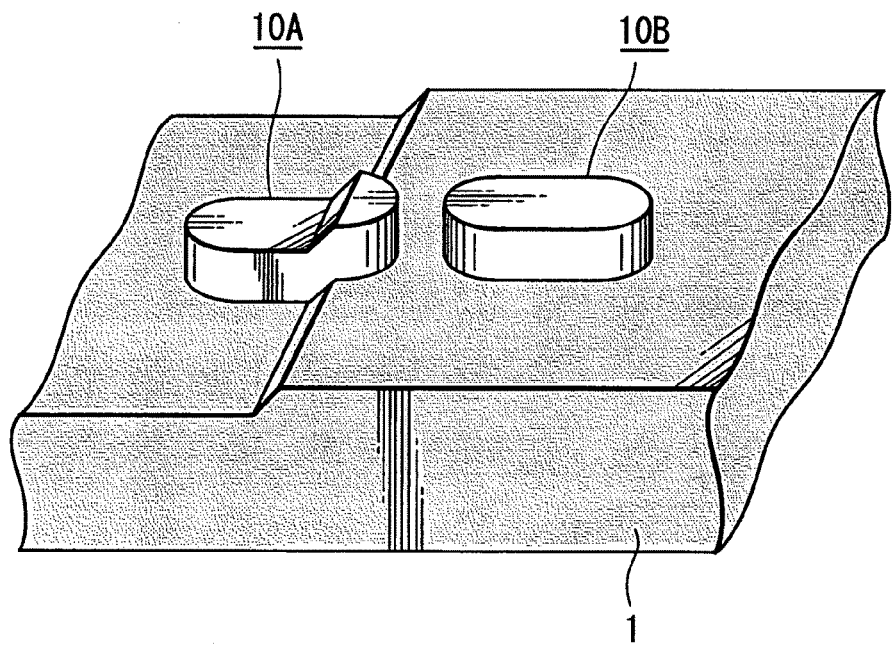
FIG. 34 is a schematic perspective view showing an arrangement of a scatterer for use with an optical near-field generating device according to an embodiment of the present invention.

If the end portion of the second area, to generate an optical near-field not for use, of the second scatterer 10B is not provided within a diameter of the beam spot of the incident light applied from the light source, then the second scatterer 10B is not necessarily formed on the substrate with the level difference. FIG. 34 is a perspective view schematically showing such case.

If, on the contrary, the second area of the second scatterer 10B is provided within the diameter of the beam spot of the incident light, it is desirable as shown in FIG. 33 that the two scatterers 10A and 10B should be both formed across the level differences 1S1 and 1S2 so that they may be made distant from the object such as an information recording medium with the level difference.

It should be noted that the first and second scatterers 10A and 10B are not necessarily identical in shape. However, if the first and second scatterers 10A and 10B have the identical shape, then it becomes possible to excite plasmon resonance simultaneously in both the scatterers 10A and 10B and hence the more intensive optical near-field can be generated between the two scatterers 10A and 10B.

Figure 35A:
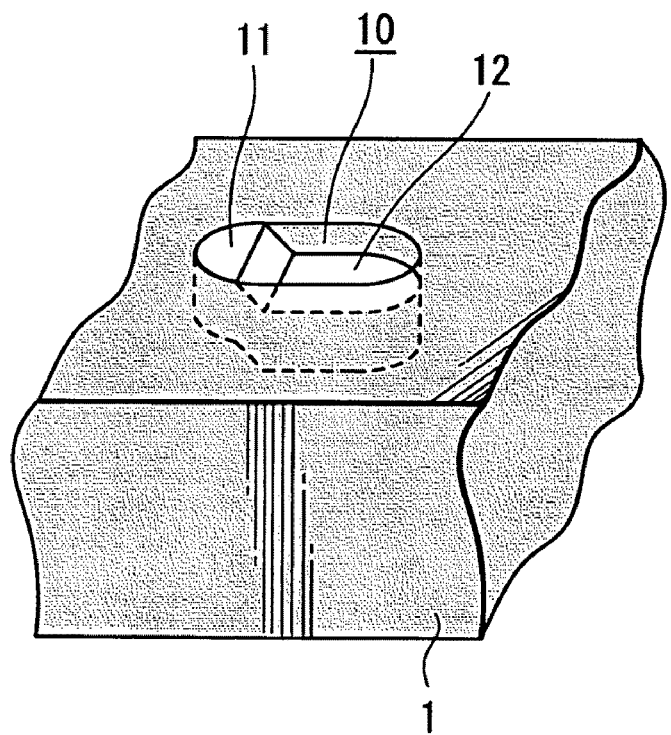
FIG. 35A is a schematic perspective view showing an arrangement of a scatterer for use with an optical near-field generating device according to an embodiment of the present invention and FIG. 35B is a schematic side view showing an arrangement of a scatterer for use with an optical near-field generating device according to an embodiment of the present invention.
Figure 35B:
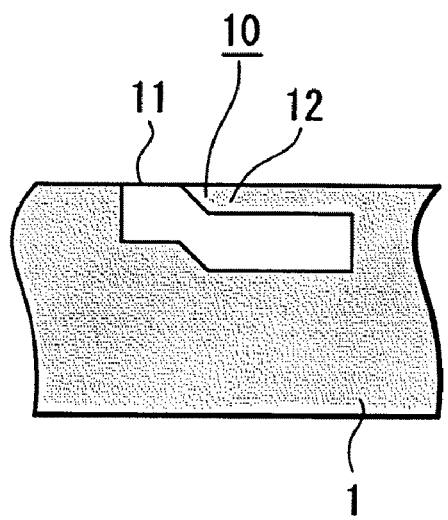

Further, a scatterer for use with the optical near-field generating device according to an embodiment of the present invention may be buried into the substrate. FIGS. 35A and 35B are a schematic perspective view and a schematic side view showing an example of this case, respectively. FIGS. 35A and 35B show the example in which the scatterer 10 is buried into the substrate 1 and in which the first area 11 for generating an optical near-field, in particular, is flush with the surface of the substrate 1.

In the case where the optical near-field generating device according to an embodiment of the present invention is applied to an information recording and reproducing apparatus, the scatterer 10 having the aforementioned shape shown in FIG. 5, for example, is formed on the substrate 1. Subsequently, if an information recording medium serving as an object is rotated at a high speed, the information recording medium may collide with the first area 11 depending on unevenness on the surface of the information recording medium. Then, there is a possibility that the first area 11 may be worn down or that the scatterer 10 may be broken. In order to avoid such problems, as shown in FIGS. 35A and 35B, it is preferable that the scatterer 10 should be formed so as to be buried into the substrate 1. Further, it is preferable that the first area 11 should be substantially flush with the surface of the substrate 1. The first area 11 may be substantially flush with the surface of the substrate 1, if a difference in height is within 10 nm. If the unevenness is approximately 10 nm or less, such disadvantages as frictional wear and damage caused by the height difference can be avoided sufficiently when the scatterer and the information recording medium are relatively operated.

Figure 36:
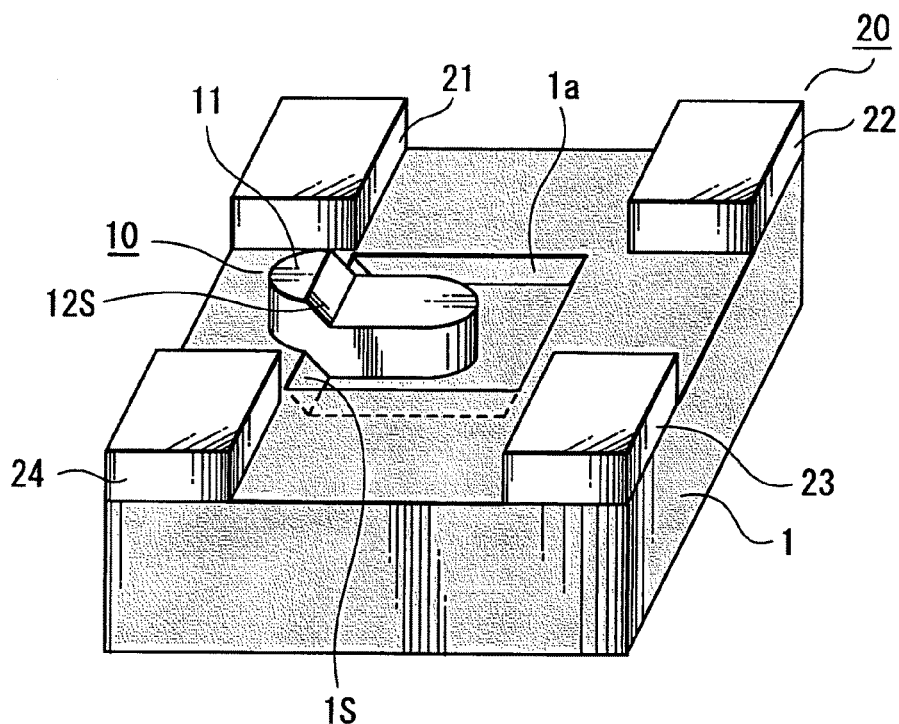
FIG. 36 is a schematic perspective view showing an arrangement of an example of a scatterer for use with an optical near-field generating device according to an embodiment of the present invention.

In order to avoid the scatterer from colliding with the object such as the above-mentioned information recording medium, as shown in FIG. 36, a pad may be formed around the scatterer 10. In the example shown in FIG. 36, a concave portion 1a one side surface of which is formed as a level difference 1S on the inclined plane is formed on a part of the substrate 1 and a rod-like scatterer 10 is formed across the level difference 1S. Then, pads 20 (21 to 24) having a planar shape of a rectangle or square with a thickness of approximately the same as that of the scatterer 10, for example, are formed around the scatterer 10 and the concave portion 1a.

When the above-mentioned pad 20 is provided, the scatterer may be avoided from colliding with the object such as an information recording medium, and damage brought by the above-mentioned collision may be alleviated, thereby protecting the scatterer 10. Further, if the position and shape of the pad 20 are suitably devised, then the information recording and reproducing apparatus may be given a function to retain a distance between the information recording medium, which is rotating at a high speed, and the first area 11 of the scatterer 10 to be constant.

It should be noted that, while the pad 20 may be made of a resilient material which is strong against shock, the pad 20 may be made of the same material as that of the scatterer 10 so that the pad 20 and the scatterer 10 can be formed at the same time upon deposition and patterning process to form the scatterer 10.

Figure 37:
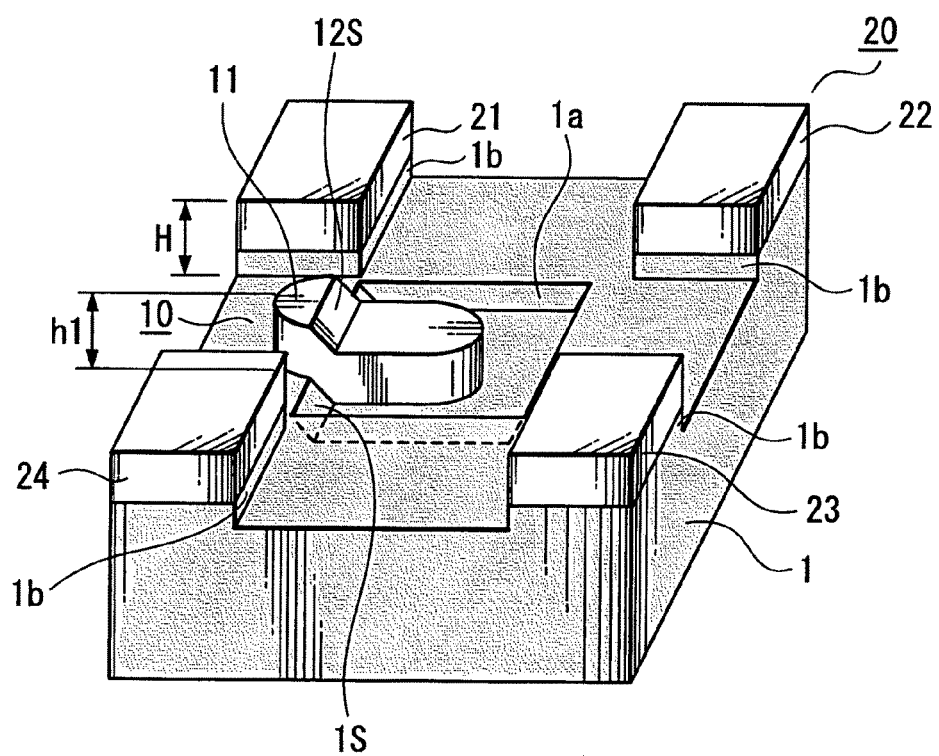
FIG. 37 is a schematic perspective view showing an arrangement of an example of a scatterer for use with an optical near-field generating device according to an embodiment of the present invention.
Figure 38:
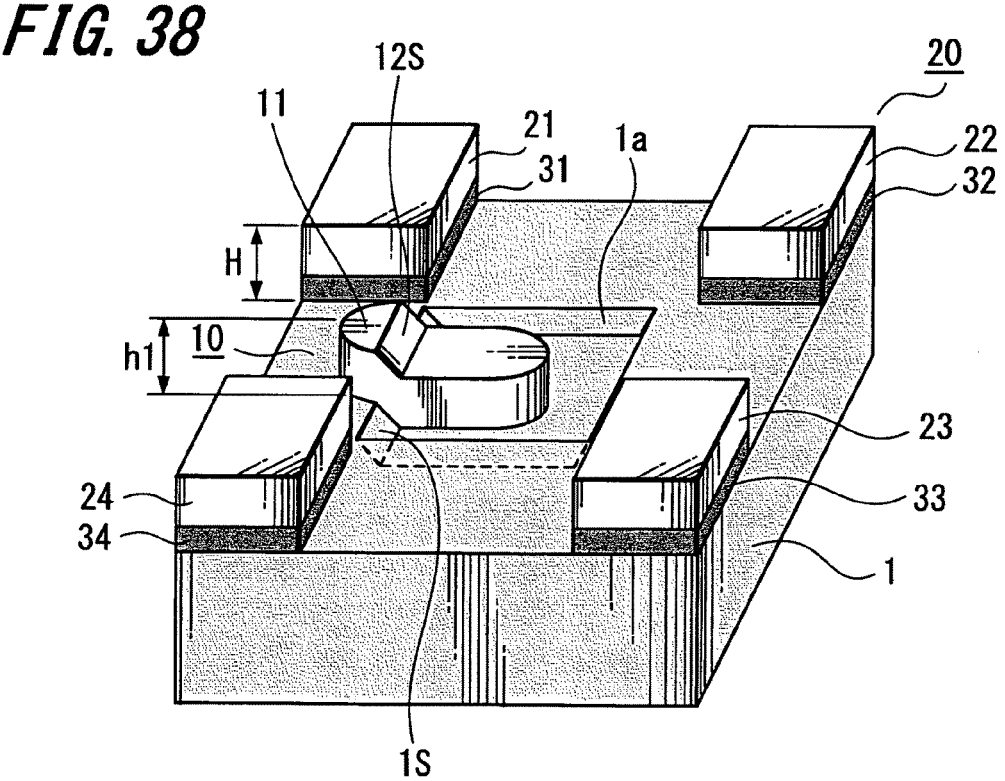
FIG. 38 is a schematic perspective view showing an arrangement of an example of a scatterer for use with an optical near-field generating device according to an embodiment of the present invention.

FIG. 38 is a schematic perspective view showing an example in which a height H of the pad 20 is selected to be higher than the height h1 of the first area 11 so that the surface of the first area 11 of the scatterer 10 is located distant from the object such as an information recording medium as compared with the surface of the pad 20. In FIG. 37, elements and parts corresponding to those in FIG. 36 are denoted by the same reference numerals and need not be described repeatedly. FIG. 37 shows the example in which level differences 1b which become base portions of pads 21 to 24 are respectively provided on the substrate 1, the pads 21 to 24 being arranged on the level differences 1b. Specifically, the pads 21 to 24 are formed on the highest surfaces on the level differences 1b, the first area 11 of the scatterer 10 is formed on a surface with an intermediate height and the second area 12 of the scatterer 10 is formed on the level difference 1S and the bottom surface of the lowest concave portion 1a. When the scatterer 10 and the pad 20 are made of the same material, the scatterer 10 and the pad 20 having the arrangements shown in FIG. 37 can be formed on the substrate 1 with the above-mentioned level differences by one deposition and patterning process. If the differences in height regarding the level differences provided on the substrate 1 are manufactured with high accuracy, even when a film thickness of a conductive film formed in a later process varies, differences in height between the surface of the pad 20 and the first and second areas of the scatterer 10 can be manufactured with high accuracy.

FIG. 38 is a schematic perspective view similar to FIG. 37 and illustrates a case of an arrangement in which the surface of the first area 11 of the scatterer 10 is made distant from the object as compared with the surface of the pad 20. FIG. 38 shows an example in which base portions 31 to 34 are made of a material different from that of the pads 21 to 24 and provided on the lower portions of the pads 21 to 24. If a material with more film thickness controllability than that of the material forming the pad 20 and the scatterer 10, for example, is used, base portions 31 to 34 made of such material are stacked on pad forming portions. Accordingly, positional relationships between the surfaces of the pads 21 to 24 and the surface of the first area 11, that is, difference in height can be controlled with high accuracy. It should be noted that the above material layers with film thickness controllability may be stacked on the pads 21 to 24 made of the same material as that of the scatterer 10.

Figure 39:
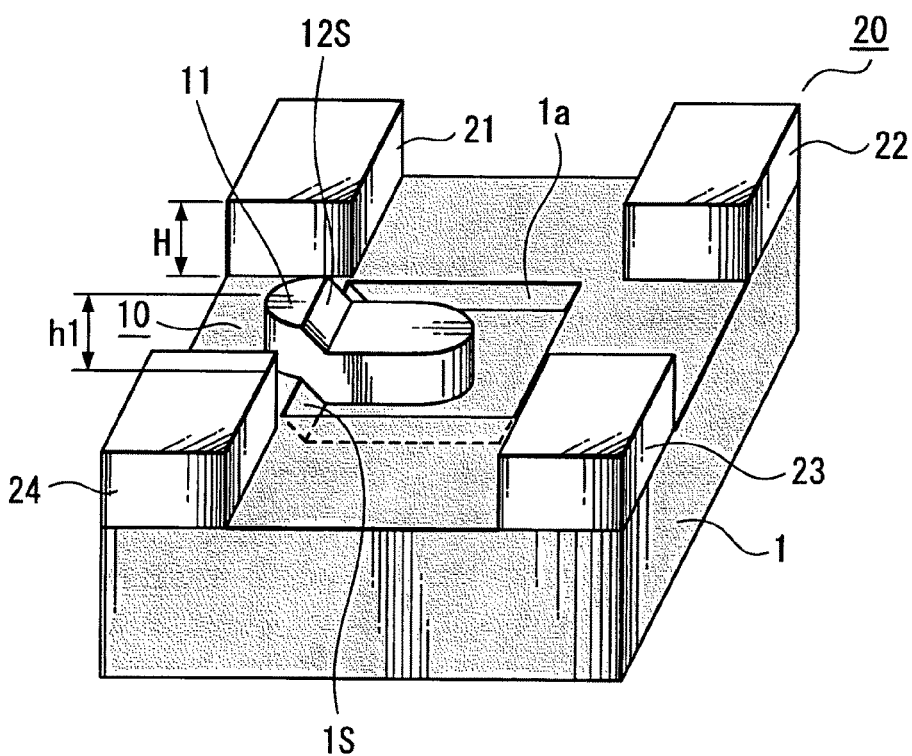
FIG. 39 is a schematic perspective view showing an arrangement of an example of a scatterer for use with an optical near-field generating device according to an embodiment of the present invention.

FIG. 39 is a similar schematic perspective view showing a case of an arrangement in which the surface of the first area 11 of the scatterer 10 is made distant from the object as compared with the surfaces of the pads 21 to 24. If the materials of the scatterer 10 and the pads 20 are excellent in film thickness controllability, it is possible to control these height relationships by increasing the stacked amounts of the pads 20 alone to a certain amount. In FIGS. 38 and 39, elements and parts corresponding to those of FIG. 37 are denoted by the same reference numerals and need not be described repeatedly.

Figure 40:
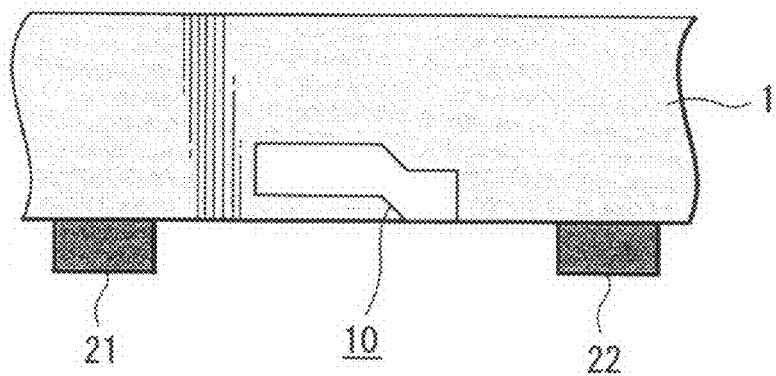
FIG. 40 is a schematic side view showing an arrangement of an example of a scatterer for use with an optical near-field generating device according to an embodiment of the present invention.

FIG. 40 is a schematic side view showing an example obtained when the scatterer 10 is buried into the substrate 1, the pads 21 and 22 being formed on the substrate 1. According to this arrangement, it is possible to reliably prevent the object from colliding with the first area 11 of the scatterer 10. In this example, the pads 21 and 22 may be made of the same material as that of the substrate 1 or may be made of a material different from that of the substrate 1.

Figure 41:
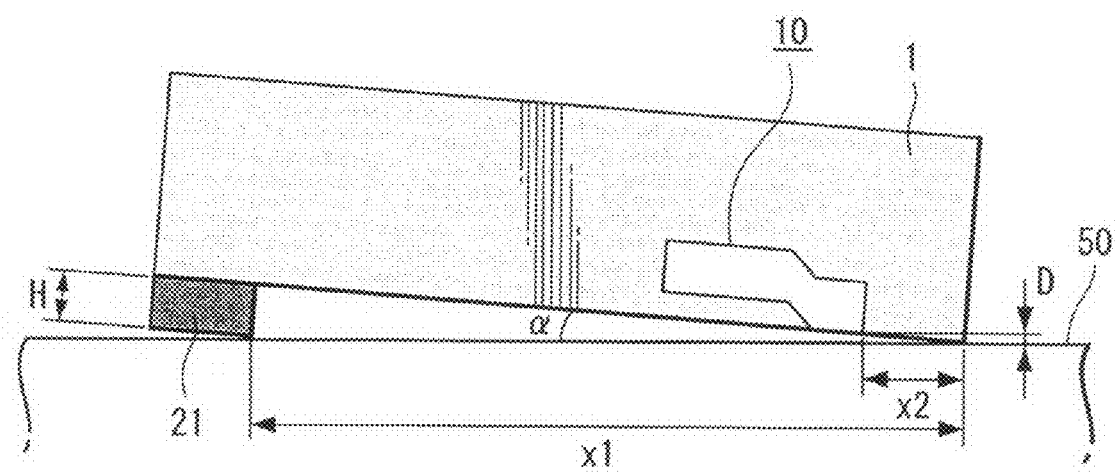
FIG. 41 is a schematic side view showing an arrangement of an example of a scatterer for use with an optical near-field generating device according to an embodiment of the present invention.

FIG. 41 is a schematic side view showing an example obtained when the scatterer 10 is buried into the substrate 1, the pad 21 being formed on the substrate 1 at its end portion most distant from the second area in the longitudinal direction of the scatterer 10. In the case of the above-mentioned arrangement, the vertex of the pad 21 provided only at one side of the substrate 1 and the end portion of the substrate 1 at the other side where the pad 21 is not provided can serve as a mechanism to retain a distance between the scatterer 10 and an object 50 such as an information recording medium. Here, as shown in FIG. 41, if an inclination angle α of the surface of the substrate 1 relative to the surface of the object 50 is sufficiently small, then the following relation is obtained:

$$D \approx H \times (x2/x1)$$

where x1 represents a distance from one end of the substrate 1 at its side close to the first area of the scatterer 10 to the pad 21; x2 represents a distance from such one end of the substrate 1 to the first area of the scatterer 10, D represents a space between the end portion of the first area and the object 50 and H represents the thickness of the pad 21. Here, $(x2/x1)<1$ is satisfied. Specifically, even when the height H of the pad 21 is not formed with high accuracy, variations of the distance D between the first area 11 to generate an optical near-field in the scatterer 10 and the object 50 can be suppressed.

According to the above-described respective examples shown in FIGS. 36 to 41, in any of the examples, the surfaces of the pads may be coated with thin films in order to improve wear resistance and insulation properties. The shape of the pads is not limited to those of the examples shown in FIGS. 36 to 41 and the number of the pads can also be selected optionally as long as the pads have the above-described functions.

Figure 42:
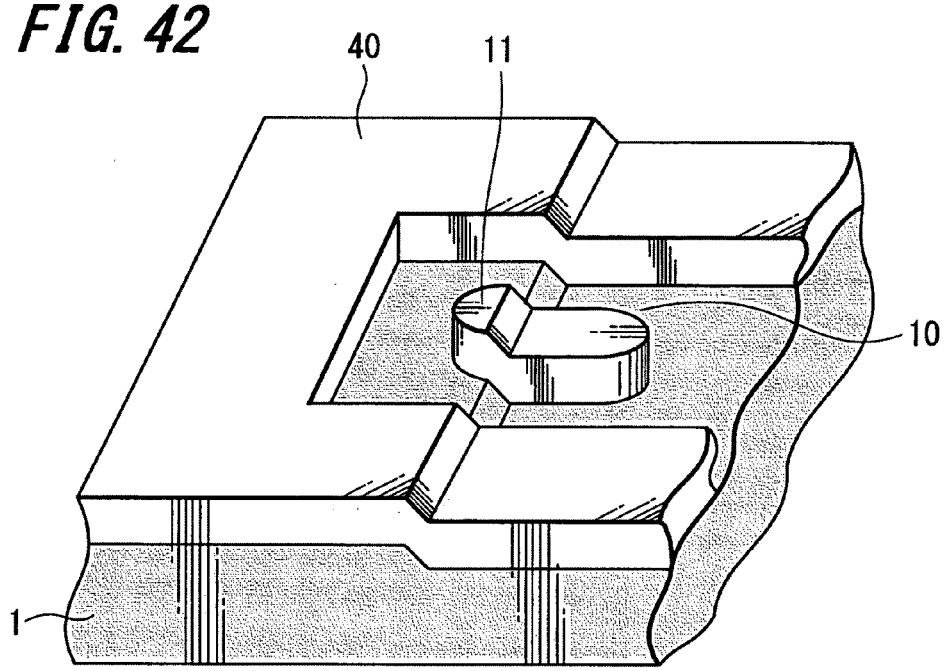
FIG. 42 is a schematic perspective view showing an arrangement of an example of a scatterer for use with an optical near-field generating device according to an embodiment of the present invention.

Next, examples in which a magnetic field generating portion is formed around a scatterer will be described. FIG. 42 is a schematic perspective view showing an example in which a magnetic field generating portion 40 made of a conductor is located around the scatterer 10 so as to surround the scatterer 10 in the optical near-field generating device according to an embodiment of the present invention. If a distance between the magnetic field generating portion 40 and the scatterer 10 is close to each other more than required, then efficiency at which an optical near-field is generated may be lowered. On the other hand, if the magnetic field generating portion 40 and the scatterer 10 are away from each other more than required, then a perpendicular magnetic field component for the object is reduced. Accordingly, positions at which the magnetic field generating portion 40 and the scatterer 10 are located may be selected suitably in response to a purpose of use in view of the points described above. When an electric current is applied to the magnetic field generating portion 40 the position of which was adjusted as described above, magnetic fields can be generated around the conductive pattern of the magnetic field generating portion 40 as shown by arrows in FIG. 43 and perpendicular magnetic fields H can be generated in the first area 11 of the scatterer 10. Accordingly, information can be recorded on the information recording medium based on heat-assisted magnetic recording.

Figure 43:
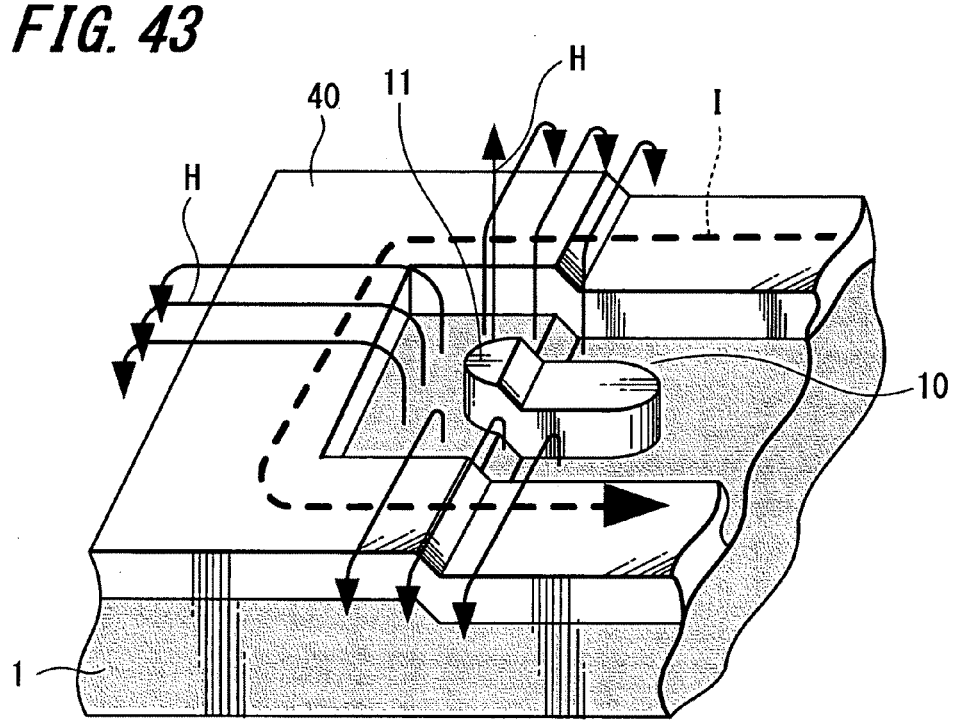
FIG. 43 is a schematic perspective view showing an arrangement of an example of a scatterer for use with an optical near-field generating device according to an embodiment of the present invention.

It should be noted that, while FIGS. 42 and 43 show the case in which the conductive pattern of the magnetic field generating portion 40 surrounds the scatterer 10 only once, a conductive pattern that can play a similar role may be wound around the scatterer 10 twice or more. When a plurality of conductive patterns are provided to surround the scatterer 10, they may be provided on the surface of the substrate 1 or they may be provided so as to form a stacked structure. When a plurality conductive patterns are provided, since respective magnetic fields generated from these conductive patterns overlap with each other, it is possible to generate magnetic fields of a large magnitude.

It should be noted that the magnetic field generating portion 40 made of the conductor, that is, metal may also serve as a light-shielding film to protect the object such as an information recording medium from incident light not for use, for example. Further, the conductive pattern is not limited to the shape wound around the scatterer 10, but a curved or straight conductor may be located with a predetermined distance between it and the scatterer 10 so that magnetic fields can be generated by applying an electric current to this conductor. For example, a straight conductive pattern that extends in the direction parallel to the longitudinal direction of the rod-like scatterer 10 may be provided on the substrate 1 with a constant distance from the scatterer 10.

Further, the above-mentioned pads that have been described so far with reference to FIGS. 36 to 41 may be provided on a part of the magnetic field generating portion and the magnetic field generating portion may also serve as the pad.

Next, respective examples of a method of manufacturing the above-mentioned scatterer will be described.

FIGS. 44A to 44F and FIGS. 45A to 45D show examples of manufacturing processes, when the scatterer 10 and the magnetic field generating portion 40 having the arrangements that had been described so far with reference to FIGS. 42 and 43 are made by using the same material.

Figure 44A:
FIGS. 44A to 44F are manufacturing process diagrams respectively showing an example of a manufacturing method of a scatterer for use with an optical near-field generating device according to an embodiment of the present invention.

First, as shown in FIG. 44A, there is prepared a substrate 1 made of a light transmissive material having a transmittance equal to or more than 70%, for example, relative to a wavelength of light for use.

Figure 44B:
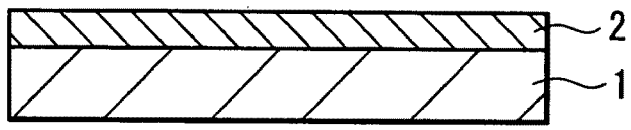
Figure 44C:
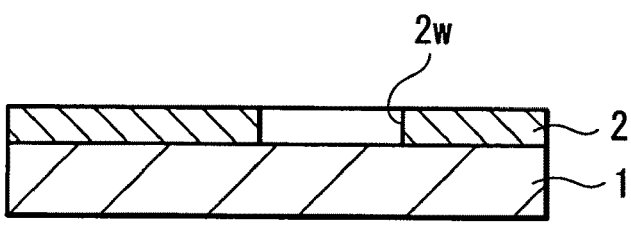

Next, as shown in FIG. 44B, a resist 2 is deposited on the substrate 1 by coating or other methods. Then, the resist 2 is exposed and developed through a mask (not shown), thereby forming an opening 2w having a predetermined shape as shown in FIG. 44C.

Figure 44D:
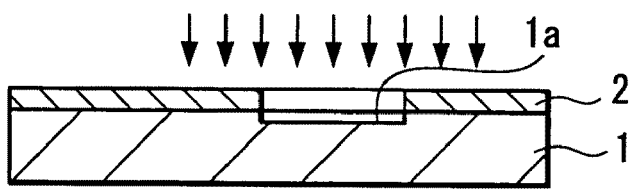
Figure 44E:
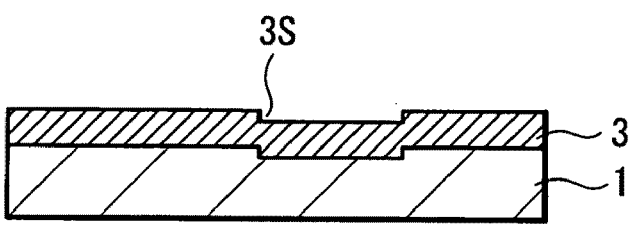
Figure 44F:
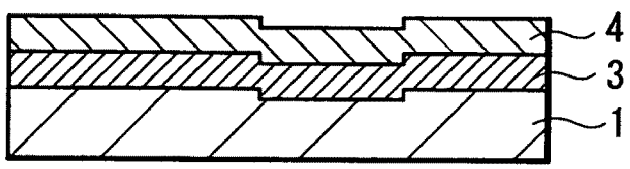

Then, the concave portion 1a is formed on the substrate 1 by carrying out anisotropic etching such as RIE (reactive ion etching) through the opening 2w of the resist 1 as shown by arrows in FIG. 44D. After the resist 2 was removed, as shown in FIG. 44E, a metal layer 3 made of a material forming the scatterer is deposited on the whole surface by sputtering or other methods. A level difference 3S corresponding to the shape of the side surface of the concave portion 1a formed on the substrate 1 is formed on the metal layer 3. Then, as shown in FIG. 44F, a resist 4 is deposited on the whole surface of the metal layer 3 by coating or other methods.

Figure 45A:
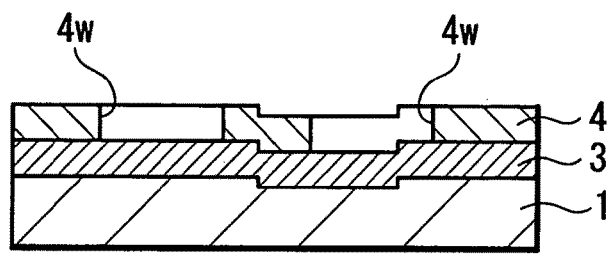
FIGS. 45A to 45D are manufacturing process diagrams respectively showing an example of a manufacturing method of a scatterer for use with an optical near-field generating device according to an embodiment of the present invention.
Figure 45B:
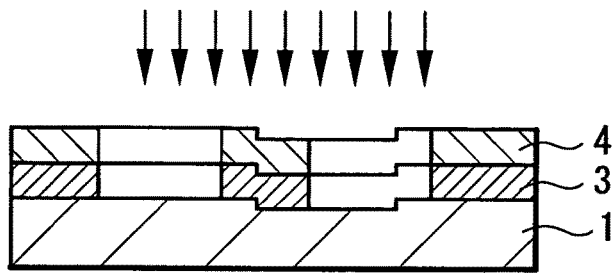

Next, as shown in FIG. 45A, an opening 4w is selectively formed to the resist 4 on the area except that the scatterer and the magnetic field generating portion are formed by mask exposure and development or other methods. Anisotropic etching such as RIE is carried out through the opening 4w, thereby selectively etching the metal layer 3 as shown in FIG. 45B.

Figure 45C:
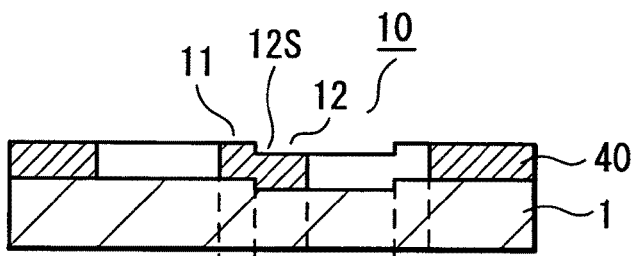
Figure 45D:
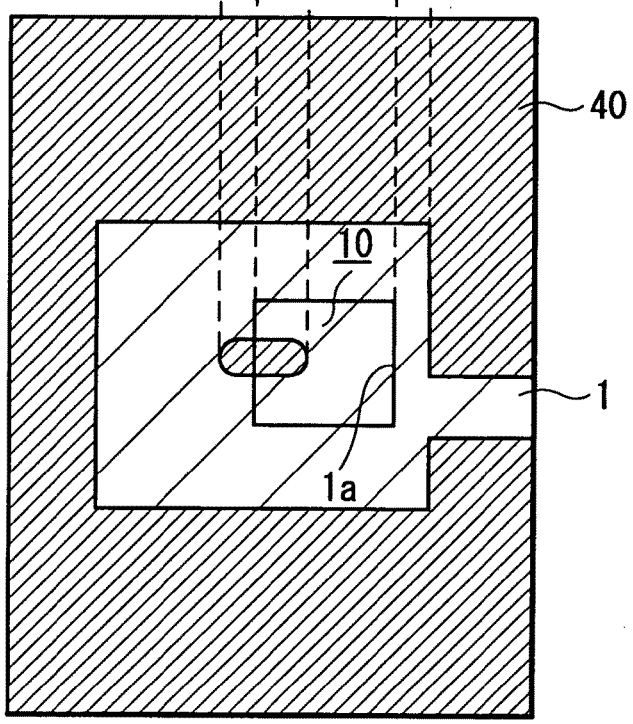

Afterward, the scatterer 10 with the first and second areas 11 and 12 formed across the level differences on the substrate 1 and the magnetic field generating portion 40 formed as the conductive pattern that surrounds the scatterer 10 can be formed by removing the resist 4 as shown in FIG. 45C and FIG. 45D which is a schematic plan view of FIG. 45C.

Figure 46A:
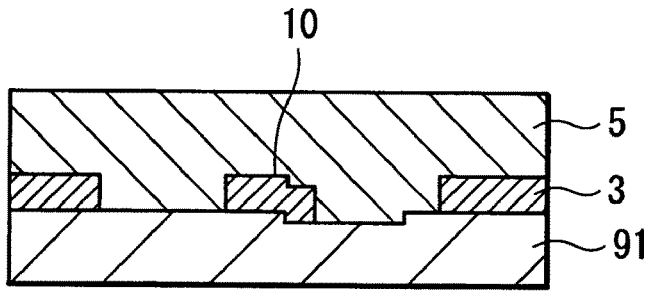
FIGS. 46A and 46B are manufacturing process diagrams respectively showing an example of a manufacturing method of a scatterer for use with an optical near-field generating device according to an embodiment of the present invention.
Figure 46B:
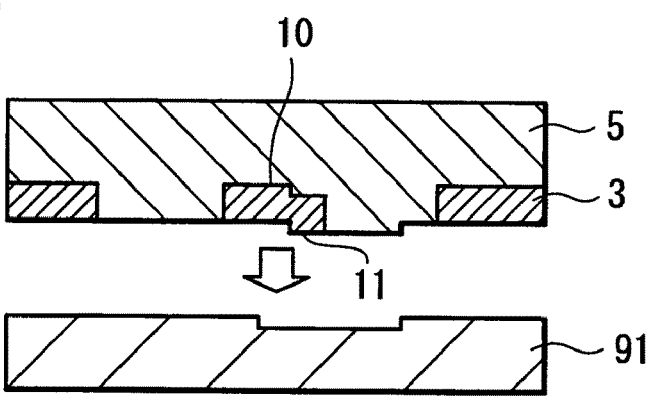

Next, FIGS. 46A and 46B show process diagrams showing an example of a manufacturing method, when a scatterer is buried into a substrate. In the aforementioned processes that have been described so far with reference to FIGS. 44A to 44F and 45A to 45D, processes shown in FIGS. 44A to 44F and 45A and 45B are carried out using a dummy substrate 91 instead of the substrate 1 made of the light transmissive material. Subsequently, as shown in FIG. 46A, a light transmissive material layer 5 made of a material such as an ultraviolet-curing resin or a thermosetting resin is stacked on the metal layer 3. Further, as shown in FIG. 46B, the surface of the light transmissive material layer 5 forming the substrate and the first area 11 of the scatterer 10 can be obtained as substantially the same flat surfaces by removing the dummy substrate 91.

Figure 47A:
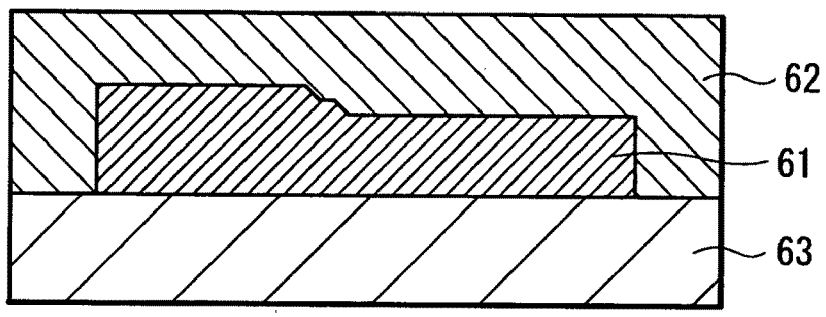
FIGS. 47A and 47B are manufacturing process diagrams respectively showing an example of a manufacturing method of a scatterer for use with an optical near-field generating device according to an embodiment of the present invention.
Figure 47B:
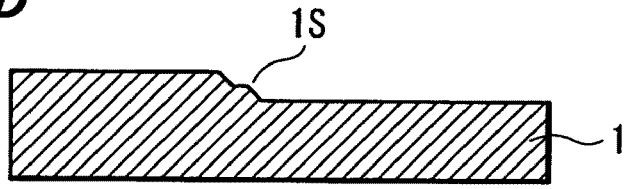

Next, a manufacturing method of an example, when a substrate is manufactured by injection molding, will be described with reference to FIGS. 47A and 47B. In this example, as shown in FIG. 47A, a light transmissive material 61 such as a thermosetting resin is injected into metal molds 62 and 63 having a concave and convex shape that is an inverted shape of the shape of desired level differences. After a curing treatment, the metal molds 62 and 63 are removed and the substrate 1 with the level difference 1S of the desired shape can be formed as shown in FIG. 47B. Subsequently, similarly to the examples that have been described so far with reference to FIGS. 44A to 44F and FIGS. 45A to 45D, the scatterer can be formed on the substrate 1.

According to the case of such injection molding, even when the uneven shape of the substrate 1 is complicated, once the metal molds are manufactured, the uneven shapes can be produced with excellent reproducibility. Further, since a period of time for injection molding may not vary greatly even when the uneven shape is complicated, the method is excellent in productivity.

Figure 48A:
FIGS. 48A to 48D are manufacturing process diagrams respectively showing an example of a manufacturing method of a scatterer for use with an optical near-field generating device according to an embodiment of the present invention.
Figure 48B:
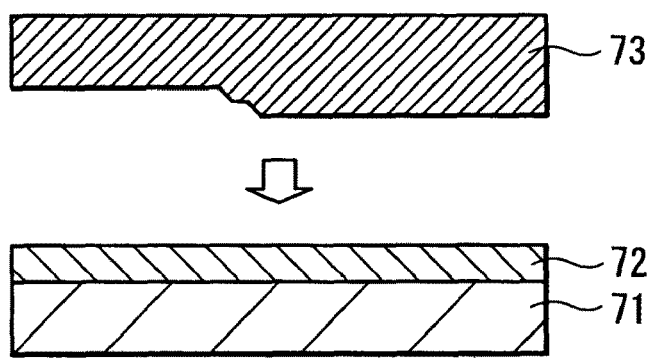
Figure 48C:
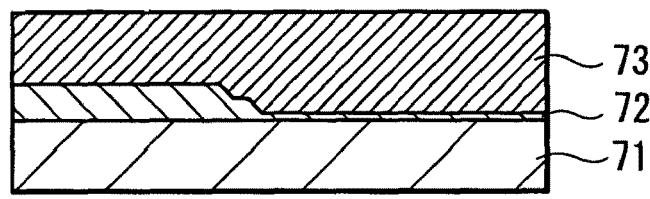
Figure 48D:
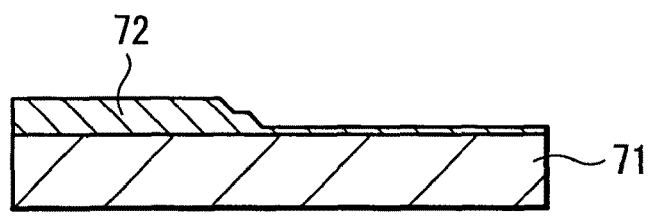
Figure 49A:
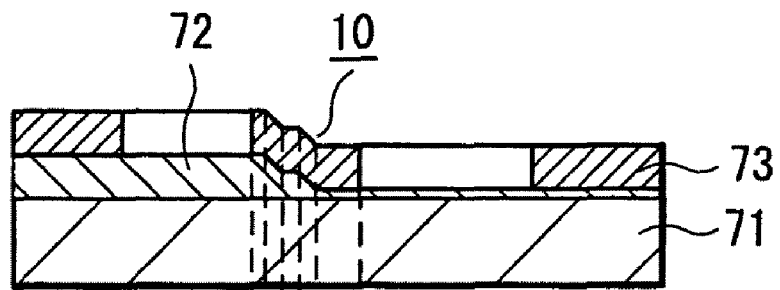
FIG. 49A is a schematic side view showing an arrangement of an example of a scatterer for use with an optical near-field generating device according to an embodiment of the present invention and FIG. 49B is a schematic plan view showing an arrangement of an example of a scatterer for use with an optical near-field generating device according to an embodiment of the present invention.
Figure 49B:
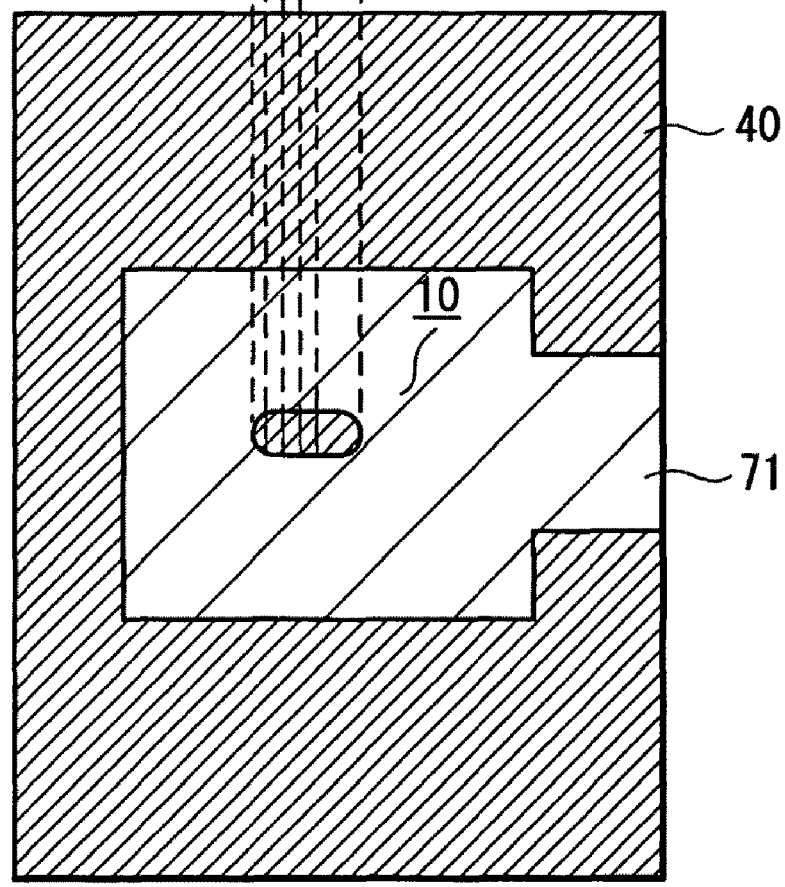

Next, an example of a manufacturing method, when a substrate made of a material with excellent environment resistance is used, will be described. As shown in FIG. 48A, there is prepared a substrate 71 made of a material, for example, quartz having sufficient transmittance for a wavelength of light for use and which is excellent in environment resistance. As shown in FIG. 48B, the substrate 71 made of quartz or the like is coated with a light transmissive material layer 72 such as a photo-setting or thermosetting resin. Subsequently, a transfer mold 73 having an inverted shape of concavities and convexities to be formed is set against the light transmissive material layer 72 as shown by an open arrow in FIG. 48B. Then, as shown in FIG. 48C, the transfer mold 73 is pressed against the light transmissive material layer 72, thereby forming desired concavities and convexities on the light transmissive material layer 72 to obtain the substrate 1 with desired concavities and convexities on the surface thereof. As a transfer method, there can be employed a method of forming the substrate 1 by pressing the heated transfer mold 73 against the light transmissive material layer 72 made of the thermosetting resin, a method of forming the substrate 1 by irradiating the light transmissive material layer 72 made of the photo-setting resin with light from the side of the substrate 1 after pressing the transfer mold 73 against the resin which is not yet cured, and the like. Manufacturing processes, which will be carried out afterward, can be made similar to those of the examples that have been described so far with reference to FIGS. 44A to 44F and FIGS. 45A to 45D. FIGS. 49A and 49B are a schematic side view and a schematic plan view respectively showing a state in which the scatterer 10 and the magnetic field generating portion 40 made of the metal layer 73 are formed on the substrate 71 and the light transmissive material layer 72.

According to the above-mentioned manufacturing method, even when shapes of concavities and convexities of the level differences on the substrate 1 are complicated, the shapes of concavities and convexities can be produced with excellent reproducibility and high accuracy. In addition, when a light transmissive material layer made of a resin having a reduced thickness is used, environmentally-resistant characteristics of a substrate made of quartz or other materials are mainly obtained. Accordingly, a highly-reliable arrangement which is difficult to be warped or deformed can be provided as compared with a case in which a substrate is made of a resin alone.

It should be noted that, the above-mentioned examples are examples in which the concave portions or level differences are formed only on one surface of the substrate 1. However, an embodiment of the present invention is not limited thereto and the shapes of concavities and convexities may be formed on the surface opposite to the surface on which the scatterer is formed. For example, the substrate may have optical functions such as a convex lens, a concave lens and a diffraction grating. Further, an optical function film having a function of changing or controlling a direction of polarization and a thin film such as an antireflection film having an optical function can be deposited on the substrate.

Further, the scatterer for use with the optical near-field generating device according to an embodiment of the present invention can be formed at a focusing point on a focusing device, a terminal end of an optical waveguide, near a resonator, near an exit surface of a semiconductor laser, near a light-receiving surface of a photo-detector and the like. In the case of having such arrangements, reliability and productivity of the scatterer may be improved by integrating assemblies of the optical path from the light source to the scatterer.

Figure 50A:
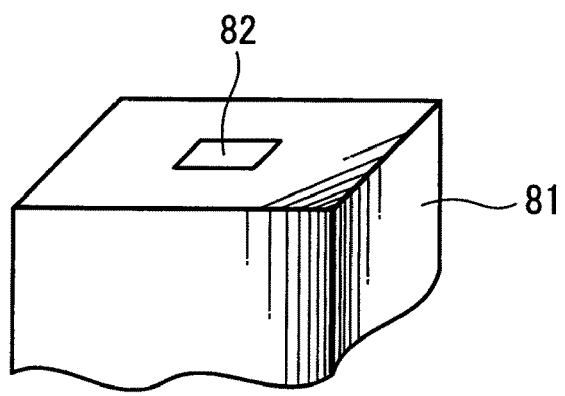
FIGS. 50A to 50E are manufacturing process diagrams respectively showing an example of a manufacturing method of a scatterer for use with an optical near-field generating device according to an embodiment of the present invention.
Figure 50B:
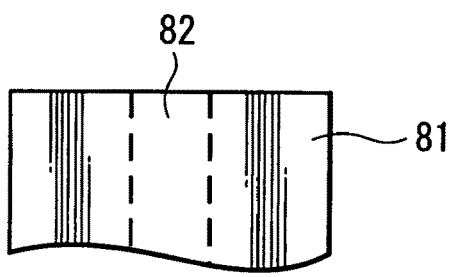
Figure 50C:
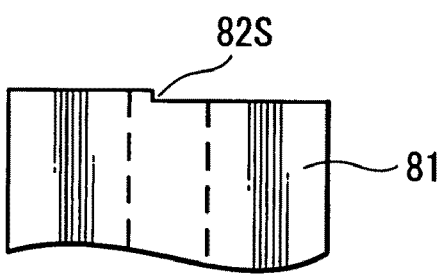
Figure 50D:
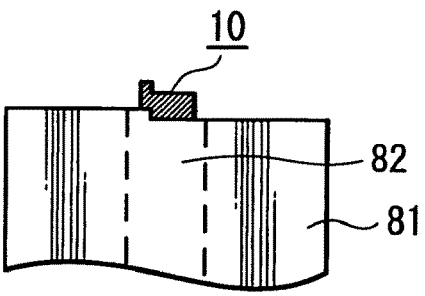
Figure 50E:
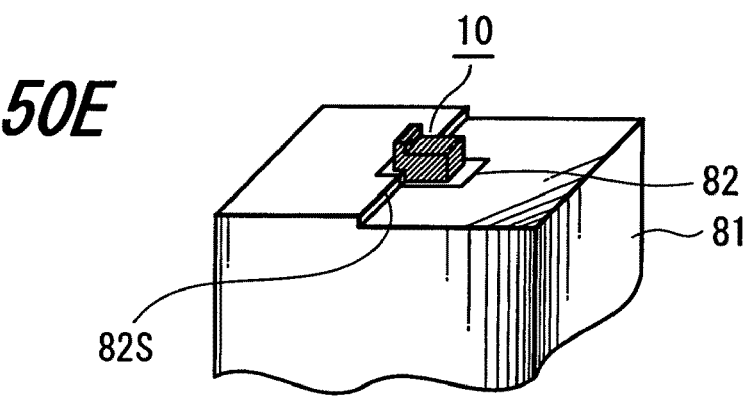

An example of a manufacturing method, when a scatterer is formed on a surface at the end of an optical waveguide, will be described with reference to manufacturing process diagrams shown in FIGS. 50A to 50E. First, as shown in FIG. 50A, there is prepared an optical waveguide in which an optical waveguide core 82 is formed at a central portion of an optical waveguide clad 81. FIG. 50B is a side view schematically showing this case. Then, a level difference 82S is formed on the surface at the end of this optical waveguide as shown in FIG. 50C. Subsequently, the scatterer 10 is formed on the level difference 82S by a method of patterning a metal layer or the like as shown in FIG. 50D. FIG. 50E is a perspective view schematically showing this state. The above-mentioned processes can be similar to those that have been described so far with reference to FIGS. 44A to 44F and FIGS. 45A to 45D. In this manner, when the scatterer is formed on the surface at the end of the optical waveguide, an optical near-field can be generated efficiently by light that propagates within the optical waveguide.

Figure 51:
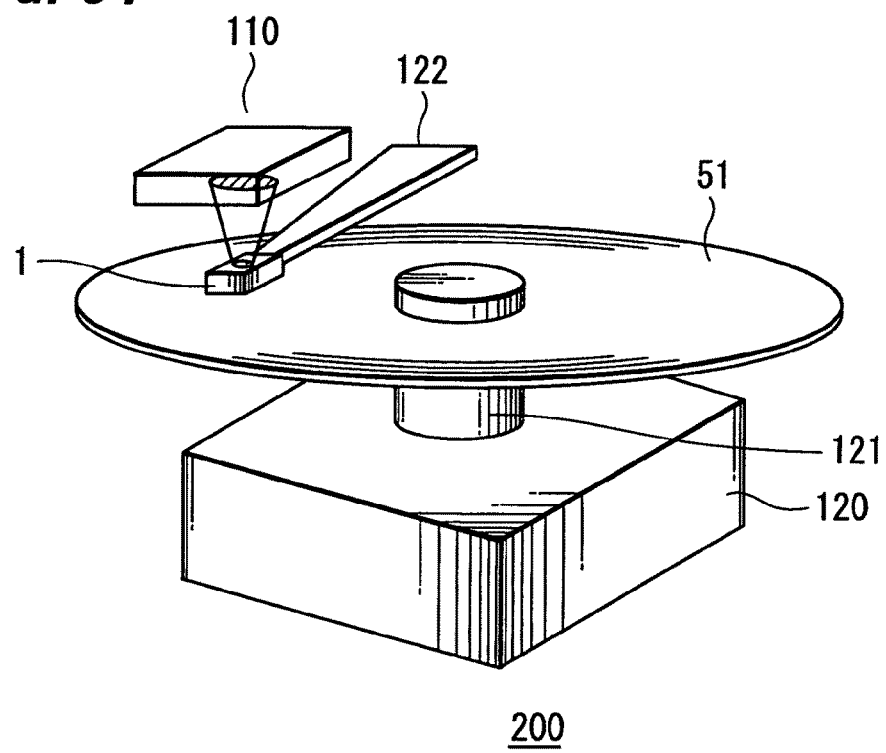
FIG. 51 is a schematic perspective view showing an arrangement of an information recording and reproducing apparatus according to an embodiment of the present invention.

FIG. 51 is a schematic diagram showing an arrangement of an example of an information recording and reproducing apparatus to which the optical near-field generating device according to an embodiment of the present invention is applied.

As shown in FIG. 51, an information recording and reproducing apparatus 200 includes a substrate 1 having a scatterer facing an information recording medium 51 and an optical system 110 having a function of introducing light emitted from a light source into the scatterer. It should be noted that the scatterer is formed across planes with different heights provided on a light transmissive substrate 1 and includes a first area formed on the plane closest to the information recording medium and a second area formed on the plane distant from the information recording medium as compared with the first area. Subsequently, an optical near-field is generated from the first area of the scatterer toward a predetermined position of the information recording medium.

In the example shown in FIG. 51, the information recording medium 51 is shaped like a disc, for example, mounted and fixed to a disc holder (not shown) on a rotary driving unit 120 and can be rotated about a rotary shaft 121 at a high speed. The substrate 1 on which the scatterer is provided is shaped like a slider, for example and attached to a suspension 122.

Hence, the substrate 1 may travel at a high speed relative to the information recording medium 51 while a space between the information recording medium 51, for example, and the first area of the scatterer is being held to be several tens of nanometers or less. Under resilient force of the suspension 122, the substrate 1 is urged to the information recording medium 51. The suspension 122 is supported within the information recording and reproducing apparatus 200 although not shown. Subsequently, light is incident on the information recording medium 51 by the optical system 110 having the light source (not shown) from the rear surface of the substrate 1 that is opposite to the surface on which the scatterer is provided.

Figure 52:
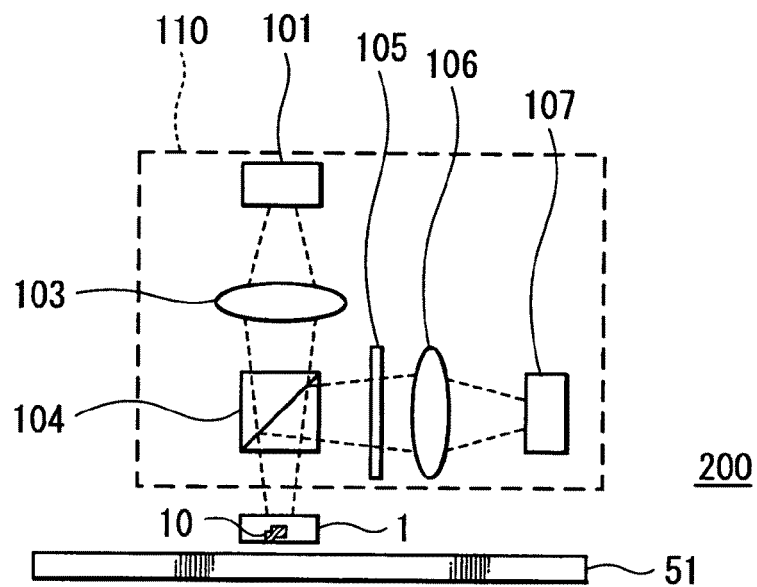
FIG. 52 is a schematic diagram showing an arrangement of a main portion of an information recording and reproducing apparatus according to an embodiment of the present invention.

FIG. 52 is a schematic diagram showing an arrangement of an example of the optical system 110. In the example shown in FIG. 52, there is provided a light source 101 in which a focusing device 103 such as a focusing lens and a beam splitter 104 are located on a light path of emitted light. A polarizer 105, a focusing device 106 and a light-receiving portion 107 are located on a light path of light reflected by the beam splitter 104, in that order. Light emitted from the light source 101 is focused with the focusing device 103, passed through the beam splitter 104 and applied to the scatterer 10 of the substrate 1 to excite surface plasmons to enable a predetermined area of the information recording medium 51, that is, a predetermined position of a recording track to which an optical near-field is applied. Light reflected from the information recording medium 51 is reflected by the beam splitter 104 of the optical system 110, passed through the polarizer 105 and focused on the light-receiving portion 107 by the focusing device 106, thereby being detected. It should be noted that the optical system 110 can be integrated with the substrate 1 so as to be attached to the suspension 122 shown in FIG. 51 together with the substrate 1.

A magneto-optical recording medium is used as the information recording medium 51, and recording marks are formed. Specifically, an optical near-field is applied to the magneto-optical recording medium using the scatterer of the information recording and reproducing apparatus having the arrangement according to an embodiment of the present invention and a direction of magnetization of a magnetic recording film is changed with application of a magnetic field by a magnetic field generating portion. Reproduction is carried out by detecting the change in intensity of light returned from the information recording medium 51 with the light-receiving portion 107 in the optical system 110 having the arrangement shown in FIG. 52. Specifically, since a ratio of an optical near-field scattered by the information recording medium 51 is changed depending on presence or absence of recording marks, reproduction may be carried out by detecting the change in intensity of scattered light. In the optical system 110 shown in FIG. 52, signal light from the information recording medium 51 is separated from incident light by the beam splitter 104, passed through the polarizer 105 and the focusing device 106 and detected by the light-receiving portion 107. Here, if the direction of polarization of signal light from the information recording medium 51 is different from the direction of polarization of incident light, the polarizer 105 is located on the light path. If the direction of polarization of the polarizer 105 may become perpendicular to the direction of polarization of incident light, then it is possible to improve contrast.

Figure 53:
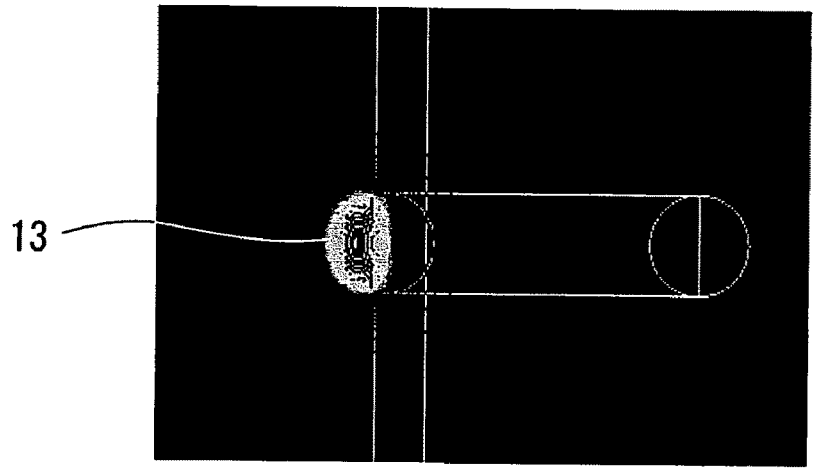
FIG. 53 is a diagram showing optical near-field intensity distribution of an information recording and reproducing apparatus according to an embodiment of the present invention.

FIG. 53 is a microscopic representation showing intensity distribution of an optical near-field on the surface of the information recording medium 51 in the case in which the aforementioned scatterer 10 shown in FIG. 10 and FIGS. 11A and 11B is shaped as follows. Specifically, in this case, the scatterer 10 is shaped so as to satisfy the following conditions:

a=10 nm
w=24 nm
h2=30 nm
g=20 nm
l=100 nm
θ1=θ2=60°

Here, $SiO_2$ was selected as the material for the substrate 1, Gold (Au) was selected as the material for scatterer 10 and TbFeCo was selected as the material for a recording film of the information recording medium 51. Further, a distance between the first area of the scatterer 10 and the information recording medium 51 was selected to be 8 nm and a wavelength of light emitted from the light source 101 was selected to be 780 nm. It should be noted that the scatterer 10 and the conductive pattern formed to surround the scatterer 10 and functioning as the magnetic field generating portion may be formed on the surface of the substrate 1 although not shown.

As shown in FIG. 53, since the planar shape of the first area in this example is shaped like an ellipse having a major axis direction in the width direction of the scatterer, the intensity distribution of an optical near-field also is shaped like an ellipse which is extended in the width direction of the scatterer 10.

Figure 54:
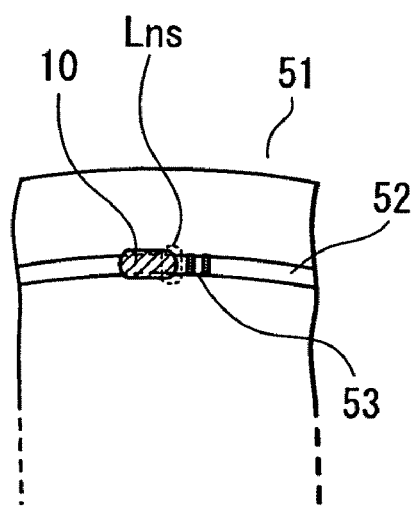
FIG. 54 is a diagram showing a positional relationship between a recording track on an information recording medium and a scatterer.

In order to facilitate tracking servo in an information recording and reproducing apparatus, preferably a recording mark should be formed in a long shape in the direction perpendicular to the direction in which recording tracks are extended. Accordingly, in order that such marks are recorded with optical near-field shaped like an ellipse shown in FIG. 53, it is preferable that the longitudinal direction of the scatterer 10 should be located along the direction in which a recording track 52 on the information recording medium 51 is extended as shown in FIG. 54. According to the above-mentioned arrangement, the recording mark 53 can be formed in a shape extending in the direction perpendicular to the extending direction of the recording track 52.

In the above-mentioned information recording and reproducing apparatus 200, the information recording medium 51 is not limited to the magneto-optical recording medium and a magnetic recording medium can also be used. In addition, other mediums such as a phase-change type medium and a dye medium can be used as the information recording medium 51.

Further, in the information recording and reproducing apparatus according to an embodiment of the present invention, a read-only magnetic reproducing head can be used. When the magnetic reproducing head is in use, optical assemblies for use in photo-detection can be removed from the above-mentioned optical system 110 so that the apparatus can be small-sized. Further, the information recording and reproducing apparatus can be configured as a write-only information recording apparatus.

As set forth above, according to embodiments of the optical near-field generating device and the optical near-field generating method of the present invention, the following effects may be obtained:

(1) Since height differences are provided on a substrate and a scatterer is formed thereon, the optical near-field generating device can be formed with an extremely simplified method;

(2) Since a thickness of a scatterer at an area from which an optical near-field is generated and applied to an object is larger than that at a portion generating an optical near-field not for use, it is possible to reliably suppress intensity of the optical near-field not for use so as not to increase;

(3) Since an optical near-field generating area can be easily formed as a small area, an optical near-field generating device which is high in light utilization efficiency can be obtained;

(4) Since an optical near-field generating area is formed as a plane, it becomes easy to control a space between the scatterer and an object such as an information recording medium and an optical near-field generating device can be manufactured with a high yield. Further, stability of the shape of a beam spot of an optical near-field can be improved against the change of the space;

(5) Since a manufacturing method includes typical processes, an optical near-field generating device can be manufactured with ease; and (6) Since a magnetic field generating portion and if necessary a light-shielding film can be produced at the same time, a relative positional relationship between the scatterer and the magnetic field generating portion can be easily formed with high accuracy.

It should be noted that the present invention is not limited to the above-mentioned respective embodiments and can be variously modified and altered without departing from the arrangement of the present invention and that arrangements described in the different examples can be combined suitably.

It should be understood by those skilled in the art that various modifications, combinations, sub-combinations and alterations may occur depending on design requirements and other factors insofar as they are within the scope of the appended claims or the equivalents thereof.

What is claimed is:

1. An optical near-field generating device comprising:
a light source;
a light transmissive substrate; and
a conductive scatterer irradiated with light from the light source to generate an optical near-field,
wherein the scatterer is formed across planes with different heights on the light transmissive substrate, including a first area formed on a surface closest to an object to which the optical near-field is applied and a second area formed on a surface distant from the object as compared with the first area, and generating the optical near-field from the first area of the scatterer toward the object,
wherein the scatterer has a relationship represented by $$h1 \leq h2$$

where h1 is a thickness of the first area and h2 is a thickness of a portion of the second area farthest from the first area.

2. An optical near-field generating device comprising: a conductive scatterer on a surface of a light transmissive substrate, a portion of said surface being closer to an object to which the optical near-field is applied than another portion of said surface; wherein an inclined plane on said surface separates said portion of the surface from said another portion of the surface, wherein a first area of the scatterer is closer to said object than a second area of the scatterer, wherein said scatterer has a relationship represented by h1≦h2, where: h1 is a thickness of the first area, and h2 is a thickness of a portion of the second area farthest from the first area.

3. The optical near-field generating device according to claim 2, wherein said second area of the scatterer is between said object and said another portion of the surface.

4. The optical near-field generating device according to claim 2, wherein said first area of the scatterer is between said object and said portion of the surface.

5. The optical near-field generating device according to claim 2, wherein a surface of the first area is substantially parallel to a surface of the object.

6. The optical near-field generating device according to claim 2, wherein an optical near-field is generated when said scatterer is irradiated with light, said optical near-field from said surface of the first area being generated.

7. The optical near-field generating device according to claim 2, wherein said second area of the scatterer is separated from said object by more than a reaching length, said reaching length being a distance in which an intensity said light becomes ½ of that on a surface of the scatterer.

8. The optical near-field generating device according to claim 2, wherein the scatterer generates said optical near-field from the first area at least a part of which is formed as a flat surface arranged substantially parallel to a surface of the object.

9. The optical near-field generating device according to claim 2, wherein the scatterer is formed across three or more planes with different heights on the substrate.

10. The optical near-field generating device according to claim 2, wherein the scatterer is formed across one or more planes and one or more planes inclined to the planes provided on the substrate.

11. The optical near-field generating device according to claim 2, wherein said second area of the scatterer is closer to said object than a third area of the scatterer.

12. The optical near-field generating device according to claim 11, wherein said third area of the scatterer is between said object and a different portion of the surface.

13. The optical near-field generating device according to claim 2, wherein the first area of the scatterer has a shape formed of at least part of a polygon, a circle or an ellipse, or a shape formed of a combination thereof, viewed from the direction perpendicular to the surface of the object.

14. The optical near-field generating device according to claim 2, wherein a space is between said scatterer and a separate conductive scatterer, said space being equal to or less than a wavelength of light emitted from a light source.

15. The optical near-field generating device according to claim 14, wherein a first area of the separate conductive scatterer is closer to said object than a second area of the separate conductive scatterer.

16. The optical near-field generating device according to claim 2, wherein at least a part of the first area of the scatterer is formed as a surface parallel to the surface of the object and the parallel surface and the surface of the substrate are substantially flush with each other.

17. The optical near-field generating device according to claim 16, wherein the scatterer is buried into the substrate.

18. The optical near-field generating device according to claim 2, wherein said object is an information recording medium, said optical near-field generated from the scatterer being applied to a predetermined position of the information recording medium to record information on the information recording medium.

19. The optical near-field generating device according to claim 2, wherein a light-shielding film surrounds the scatterer.

20. An information recording and reproducing apparatus comprising:
an optical system configured to introduce light into the scatterer; and
the optical near-field generating device according to claim 2.

21. An optical near-field generating method of generating an optical near-field, the method comprising the steps of: forming a conductive scatterer on a surface of a light transmissive substrate, a portion of said surface being closer to an object to which the optical near-field is applied than another portion of said surface; irradiating said scatterer with light to generate an optical near-field, said optical near-field reaching a surface of said object, wherein a first area of the scatterer is closer to said object than a second area of the scatterer, said optical near-field being generated from said first area, wherein said second area of the scatterer is separated from said object by more than a reaching length, said reaching length being a distance in which light intensity becomes ½ of that on a surface of the scatterer.

* * * * *